United States Patent [19]

Kim et al.

[11] Patent Number: 5,355,216
[45] Date of Patent: Oct. 11, 1994

[54] OPTICAL FIBER SENSOR HAVING DIGITAL INTEGRATING DETECTION SYSTEM UTILIZING ELECTRONIC PHASE LOCK LOOP

[75] Inventors: Byoung Y. Kim, Menlo Park; Kenneth A. Fesler, Sunnyvale; James S. Bunn, Malibu, all of Calif.

[73] Assignee: The Board of Trustees of the Leland Stanford University, Stanford, Calif.

[21] Appl. No.: 931,111

[22] Filed: Aug. 17, 1992

Related U.S. Application Data

[63] Continuation of Ser. No. 603,801, Oct. 25, 1990, abandoned.

[51] Int. Cl.⁵ ............................................. G01C 19/64
[52] U.S. Cl. ...................................... 356/350; 385/12; 385/14
[58] Field of Search .................. 356/350, 358; 359/10, 359/12, 27, 30; 430/1; 385/12, 14

[56] References Cited

U.S. PATENT DOCUMENTS

| | | | |
|---|---|---|---|
| 4,386,822 | 6/1983 | Bergh | 350/96.15 |
| 4,410,275 | 10/1983 | Shaw et al. | 356/350 |
| 4,456,377 | 6/1984 | Shaw et al. | 356/350 |
| 4,469,397 | 9/1984 | Shaw et al. | 350/96.15 |
| 4,493,528 | 1/1985 | Shaw et al. | 350/96.15 |
| 4,529,312 | 7/1985 | Pavlath et al. | 356/350 |
| 4,536,058 | 8/1985 | Shaw et al. | 356/320 |
| 4,634,282 | 1/1987 | Shaw et al. | 356/350 |
| 4,637,722 | 1/1987 | Kim | 356/345 |
| 4,687,330 | 8/1987 | Lefevre | 356/350 |
| 4,707,136 | 11/1987 | Kim | 356/350 |
| 4,728,192 | 3/1988 | Shaw et al. | 356/350 |
| 4,735,506 | 4/1988 | Pavlath | 356/350 |
| 4,779,975 | 10/1988 | Kim | 356/350 |

*Primary Examiner*—Samuel A. Turner
*Assistant Examiner*—LaCharles P. Keesee
*Attorney, Agent, or Firm*—Knobbe, Martens, Olson & Bear

[57] ABSTRACT

An interferometer used as a rotation sensor is constructed using a strand of optical fiber, a portion of which is formed into a sensing loop. A pair of light waves are caused to counterpropagate in the sensing loop and are combined to form an optical output signal that has an intensity that varies in accordance with the difference in the phases of the two counterpropagating light waves. A phase modulator is positioned on the optical fiber in the sensing loop at a location such that the two counterpropagating light waves are modulated approximately 180 degrees out of phase. The time-varying phase modulation causes a time-varying phase difference that is combined with a rotationally-induced Sagnac effect phase to provide a total phase difference that is detected by a photodetector. The photodetector provides an electrical output signal that is processed to determine the Sagnac phase difference. The rotation rate is then calculated from the Sagnac phase difference. The processing occurs in a feedback loop in which a reference signal is multiplied by the electrical output signal to provide a feedback signal. The reference signal is adjusted so that the feedback signal is maintained at a predetermined value. The magnitude of the adjustment of the reference signal is measured and the Sagnac phase difference is determined from the measured magnitude.

20 Claims, 18 Drawing Sheets

OPTICAL FIBER SENSOR HAVING DIGITAL INTEGRATING DETECTION SYSTEM UTILIZING ELECTRONIC PHASE LOCK LOOP

This application is a continuation of application Ser. No. 07/603,801, filed Oct. 25, 1990 abandoned.

BACKGROUND OF THE INVENTION

1. Field of the Invention

The present invention is in the field of optical detection systems, and, more particularly, in the field of rotation sensors that determine rotation rates by sensing the phase difference between a pair of counterpropagating light waves in an optical loop.

2. Description of the Related Art

Fiber optic rotation sensors typically include a loop of fiber optic material to which light waves are coupled such that a pair of light waves propagate around the loop in opposite directions (i.e., the two light waves are counterpropagating). When the loop is rotated, a relative phase difference is induced between the counterpropagating light waves in accordance with the well-known "Sagnac effect." The amount of phase difference corresponds to the rotational velocity of the loop. The counterpropagating light waves, when recombined, interfere constructively or destructively to produce an optical output signal that varies in intensity in accordance with the rotation rate of the loop. Rotation sensing is commonly accomplished by detection of this optical output signal.

A number of devices and techniques have been developed to process the detected optical output signal to provide an electrical output signal that represents the velocity and direction of rotation of the loop. Known devices and techniques monitor the intensity of the optical output signal to measure the phase difference between the counterpropagating light waves to determine the rotational velocity and direction in accordance with the Sagnac equation:

$$\Delta\Phi_R = \frac{8\pi NA}{\lambda c} \times Q \tag{1}$$

where:

$\Delta\Phi_R$ is the Sagnac phase difference caused by rotation of the optical loop;

A is the area bounded by the optical loop in which the light waves counterpropagate;

N is the number of times that the light waves propagate around the loop before being recombined;

Q is the angular velocity of the loop about an axis that is perpendicular to the plane of the loop; and $\lambda$ and c are the free space values of the wavelength and velocity, respectively, of the light waves applied to the optical loop.

The intensity of the optical output signal is a function of the Sagnac phase difference $\Delta\Phi_R$ between the two counterpropagating light waves as follows:

$$I_T = I_1 + I_2 + 2\sqrt{I_1 I_2} \times \cos(\Delta\Phi_R) \tag{2}$$

where $I_T$ is the intensity of the optical output signal, and $I_1$ and $I_2$ are the individual intensities of the two counterpropagating light waves.

It has been found that simple measurement of the intensity of the optical output signal will not provide sufficient information from which the direction and rate of rotation can be determined. For example, the sensitivity of the phase difference measurement is effectively zero for phase differences that are integral multiples of $\pi$ (i.e., $\Delta\Phi_R = N\pi$ for $N = \ldots -2, -1, 0, 1, 2, \ldots$) because the interference intensity is an even, periodic function of the phase difference (i.e., the interference intensity varies as a cosine function as set forth in Equation 2 above. Thus, small phase differences cannot be directly measured near a zero rotation rate. Typically, this difficulty in measuring small phase differences is overcome by dynamic biasing wherein an additional phase modulation is introduced into the closed path around which the light waves are propagating. A time-varying modulation with a zero mean amplitude is generally used rather than a static modulation. The dynamic biasing causes the phase signal to reach values where the sensitivity is suitably large so that the phase difference is readily measurable.

A gyroscope with dynamic biasing can be readily used to measure small rotation rates. When the phase modulation is a harmonic signal of a predetermined frequency, a small phase shift caused by the rotation of the optical loop causes the intensity of the optical output signal to include a time-varying component at the predetermined frequency. This time-varying component can be demodulated to provide a measure of the Sagnac phase shift and thus the rotation rate. Various approaches have been used to demodulate the time-varying component to derive the Sagnac phase shift. Such approaches are described, for example, in U.S. Pat. Nos. 4,410,275; 4,456,377; 4,529,312; 4,634,282; 4,637,722; 4,687,330; 4,707,136; 4,728,192 and 4,779,975.

SUMMARY OF THE INVENTION

One aspect of the present invention is a sensing apparatus that comprises an interferometer which produces an output signal responsive to a phase difference between first and second optical signals propagating in the interferometer. The sensing apparatus further includes a generator that generates a reference signal, and a circuit which is connected to receive the reference signal and the output signal. The circuit produces a feedback signal in response to the reference signal and the output signal. The generator is connected to receive the feedback signal and to vary the reference signal in response to the feedback signal.

Preferably, the generator modifies a parameter of the reference signal in response to the feedback signal to null the feedback signal. The amount of the modification of the reference signal being related to a quantity sensed by the interferometer. For example, the parameter advantageously comprises the harmonic content of the reference signal. As a further aspect of the invention, the parameter comprises a phase shift which is related to the quantity sensed by the interferometer.

In particularly preferred embodiments of the sensing apparatus, the interferometer comprises an optical loop in which the first and second waves counterpropagate, and a phase modulator in the loop that phase modulates the counterpropagating waves. The phase modulator is independent of the feedback signal. In such embodiments, the modification of the parameter is caused by a phase shift. The phase modulator is driven to provide a phase excursion which yields a linear relationship between the phase shift and the quantity sensed by the interferometer. This embodiment is particularly advantageous for sensing rotation of the optical loop.

The preferred embodiment of the circuit comprises a multiplier which multiplies the output signal and the reference signal to provide the feedback signal. The circuit may additionally comprise a low pass filter which eliminates AC components in the feedback signal. In this embodiment, the first and second optical signals are phase modulated at a predetermined phase modulation frequency and a predetermined phase modulation amplitude. The optical signal from the interferometer and the reference signal both comprise harmonics of the modulation frequency. The modulation frequency and modulation amplitude are independent of the output signal from the interferometer. Preferably, the phase modulation amplitude is approximately 2.77 radians.

An additional aspect of the invention is a method of processing an output signal from an interferometer to determine a change in a phase difference between two optical signals propagating in said interferometer. The method comprising the steps of generating a reference signal; generating a feedback signal in response to (i) said reference signal and (ii) said output signal from said interferometer; modifying said reference signal in responses to changes in said output signal to drive said feedback signal to a predetermined value; and measuring the modification to said reference signal to determine said changes in said phase difference.

A still further aspect of the invention is a method of processing an output signal from an interferometer to determine changes in a phase difference between two optical signals propagating in said interferometer. The optical signals are phase modulated at a predetermined frequency, and the output signal comprises harmonics of the predetermined frequency. The method comprises the steps of multiplying the output signal with a reference signal comprising harmonics of the frequency to produce a signal of predetermined magnitude at a first phase difference; multiplying the harmonic content of the reference signal to maintain the predetermined magnitude when the phase difference changes to a second phase difference; and measuring a reference signal modification parameter to determine the change in the phase difference. In this method, the reference signal modulation parameter comprises a phase shift, and the phase modulation is at an amplitude selected to provide a linear relationship between the phase shift parameter of the reference signal and the phase difference of the optical signals.

One further aspect of the invention is a rotation sensing apparatus that comprises an interferometer that has a pair of counterpropagating waves in an optical loop. The interferometer combines the counterpropagating waves to form an output signal. The apparatus further includes a circuit that receives the output signal. The circuit comprises a feedback loop that processes the output signal of the interferometer and determines rotation of the loop without affecting the counterpropagating waves in the loop.

The present invention includes a detection system for a Sagnac effect rotation sensor. The sensor includes an optical loop for counterpropagating optical signals and a modulator that asymmetrically modulates the counterpropagating light signals at a modulation frequency so that the rotation sensor provides an optical output signal having an intensity that varies in response to the modulation signal and in response to rotation. The detection system comprises a detector that receives the optical output signal and that generates an electrical output signal responsive thereto. In preferred embodiments, the system also includes means for eliminating any DC component in the electrical output signal and generating an AC detector signal. The AC detector signal comprises odd and even harmonics of the modulation frequency. A multiplier receives the AC detector signal and receives a reference signal. The multiplier provides a multiplier output signal responsive to the multiplication of the AC detector signal and the reference signal. A low pass filter receives the multiplier output signal and generates a low pass filter output signal having a magnitude and a polarity responsive to the DC components of the multiplier output signal. A signal generator is included that receives the low pass filter output signal and that generates the reference signal. The reference signal comprises a pulse train having pulses that are spaced with respect to each other such that the reference signal comprises odd and even harmonics of the modulation frequency so that the reference signal multiplied by the AC detector signal produces a multiplier output signal having a DC magnitude substantially equal to zero.

DETAILED DESCRIPTION OF THE PREFERRED EMBODIMENT

Figure 1:
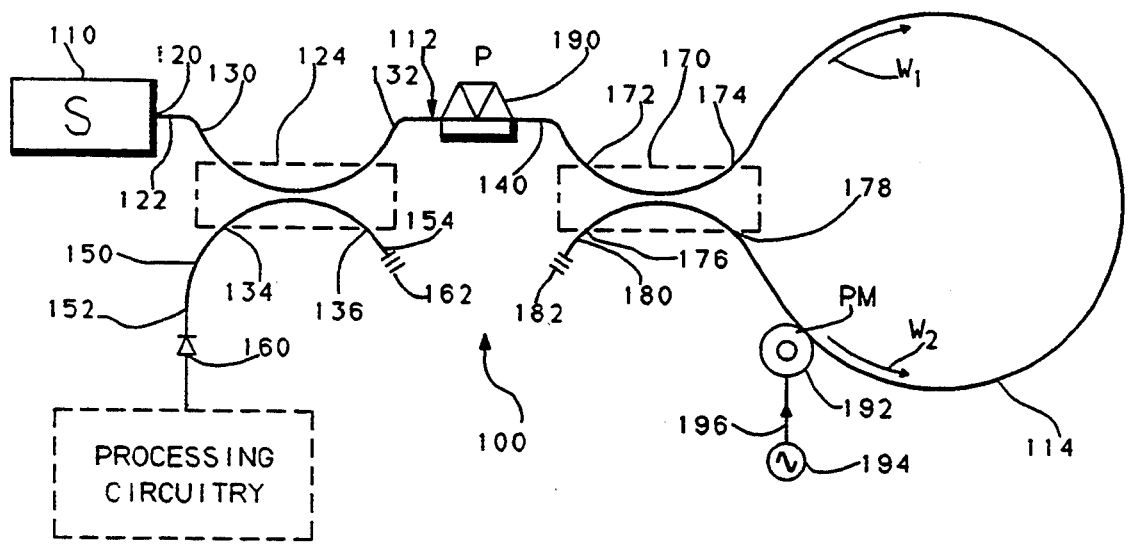
FIG. 1 is a schematic drawing of a basic Sagnac interferometer, showing fiber optic components positioned along a continuous, uninterrupted length of fiber optic material, and further showing a photodetector that detects the optical output signal and processing circuitry to process the electrical signal generated by the photodetector.

As shown in FIG. 1, a simplified open loop rotation sensor includes a light source 110 that introduces light into a continuous length of a first optical fiber 112. A portion of the first optical fiber 112 is wound into a sensing loop 114. The first optical fiber 112 is preferably a single-mode optical fiber having, for example, an outer cladding diameter of about 80 microns and an inner core diameter of about 4 microns. The single-mode fiber 112 is preferably a high birefringence fiber, although non-birefringent fiber may also be utilized. The sensing loop 114 comprises a plurality of turns of the first optical fiber 112 wrapped around a spool or other support (not shown). By way of specific example, the sensing loop 114 may comprise approximately 1000 turns of the first optical fiber 112 wound on a form having a diameter of approximately 14 centimeters.

Preferably, the sensing loop 114 is wound symmetrically, starting from the center of the length of fiber in the loop 114, so that symmetrical points in the loop are in proximity. Symmetrical winding of the sensing loop 114 reduces the environmental sensitivity of the rotation sensor 100 because the symmetry causes time-varying temperature and pressure gradients to have a similar effect on both counterpropagating waves in the sensing loop 114.

Light from the light source 110 is optically coupled to one end of the first optical fiber 112 by, for example, butting a first end 120 of the first optical fiber 112 against the light source 110. An input end portion (or first end portion) 122 of the first optical fiber 112 provides an optical path from the first end 120 to a first directional coupler 124 that is formed on the first optical fiber 112. The first directional coupler 124 is advantageously constructed in accordance with U.S. Pat. Nos. 4,493,528 and 4,536,058, which are incorporated herein by reference. The first directional coupler 124 has a first port 130, a second port 132, a third port 134, and a fourth port 136. The first optical fiber 112 passes through the first directional coupler 124 between the first port 130 and the second port 132, and continues as an intermediate portion 140 of the first optical fiber 112. Within the first directional coupler 124, the first optical fiber 112 is juxtaposed with a second optical fiber 150 which may be of the same type as the first fiber 112. The second fiber 150 has a first end portion 152 and a second end portion 154. The first end portion 152 of the second optical fiber extends from the third port 134 of the first directional coupler 124 and is optically coupled to a photodetector 160. The second end portion 154 extends from the fourth port 136 of the first directional coupler 124, and is terminated non-reflectively by a light-absorbing terminator 162. The directional coupler 124 is preferably constructed to couple approximately 50 percent of the light in one of the optical fibers to the other optical fiber. Accordingly, approximately 50 percent of the light propagating in the input end portion 120 of the first optical fiber 112 is coupled to the end portion 154 of the second optical fiber 150. The other 50 percent of the light exits the second port 132 of the first directional coupler 124 and propagates in the intermediate portion 140.

The intermediate portion 140 of the first optical fiber 112 provides an optical propagation path from the first directional coupler 124 to a second directional coupler 170 that may be constructed in a similar manner to the first directional coupler 124. The second directional coupler 170 has a first port 172, a second port 174, a third port 176, and a fourth port 178. The intermediate portion 140 of the first optical fiber 112 enters the second directional coupler 170 at the first port 172. After passing through the second directional coupler 170 between the first port 172 and the second port 174, the first optical fiber 112 forms the sensing loop 114, as discussed above. The first optical fiber 112 then passes back through the second directional coupler 170 from the fourth port 178 to the third port 176. A second end portion 180 of the first optical fiber 112 extends from the third port 176 and is terminated by a terminator 182 that comprises a light-absorbing material. The second directional coupler 170 is constructed to have substantially 50 percent coupling ratio. When light is input to the second directional coupler 170 via the first port 172, the light will be split so that the light output from the second directional coupler 170 will be divided substantially equally between the two output ports 174 and 178. The light output from the second directional coupler 170 forms a first light wave, represented by an arrow $W_1$, that propagates around the sensing loop 114 in a clockwise direction, as viewed in FIG. 1, and a second light wave, represented by an arrow $W_2$, that propagates around the sensing loop 114 in a counterclockwise direction. Thus, the second directional coupler 170 forms a pair of counterpropagating light waves that traverse the sensing loop 114. Since the coupling ratio of the second directional coupler 170 is 50 percent, the intensities of the two light waves $W_1$ and $W_2$ are substantially equal.

After traversing the entire length of the first optical fiber 112 that forms the sensing loop 114, the first light wave $W_1$, enters the second directional coupler 170 via the fourth port 178, and the second light wave $W_2$ enters the second directional coupler 170 via the second port 174, such that the waves $W_1$ and $W_2$ are recombined. The recombined light is coupled to the first port 172 for propagation to the intermediate portion 140 of the first optical fiber 112. Any uncoupled portion of the recombined light exits via the third port 176 to be absorbed by the light-absorbing terminator 182.

The recombined light waves propagate via the intermediate portion 140 of the first optical fiber 112 to the second port 132 of the first directional coupler 124. Approximately 50 percent of the recombined light waves that enter the second part 132 are coupled to the first end portion 152 of the second optical fiber 150 via the third port 134 and propagate to the photodetector 160. The photodetector 160 outputs an electrical signal that is proportional to the intensity of the optical output signal, and the electrical signal is processed by a processing circuit to produce a signal indicative of the rotation rate of the loop.

A polarizer 190 is advantageously formed on the intermediate portion 140 of the first optical fiber 112 between the first directional coupler 124 and the second directional coupler 170. The polarizer 190 may be constructed in accordance with U.S. Pat. No. 4,386,822, which is incorporated herein by reference. The polarizer 190 is positioned on the intermediate portion 140 of the first optical fiber 112 so that light of one polarization mode is permitted to pass through the intermediate portion 140 while the passage of light of an orthogonal polarization mode is prevented.

As set forth in U.S. Pat. No. 4,410,275, which is incorporated by reference herein, the purpose of the polarizer 190 is to ensure reciprocal operation of the rotation sensor of FIG. 1. Spurious non-reciprocal phase differences may occur in the sensor because the light travelling in each of the two polarization modes of a single mode fiber, such as the first optical fiber 112, travels at a different propagation velocity. Such a non-reciprocal phase difference is indistinguishable from a rotationally induced Sagnac phase difference, and is dependent on environmental factors, such as temperature and pressure. When the polarizer 190 is included, light passing through the polarizer 190 and into the sensing loop 114 via the second directional coupler 170 propagates in only a selected one of the two polarization modes. Furthermore, when the two counterpropagating light waves $W_1$ and $W_2$ are recombined to form the recombined optical signal, any light in the recombined optical signal that does not have the same polarization as the light applied to the sensing loop 114 is prevented from reaching the first directional coupler 124 and thus does not form part of the optical output signal that is detected by the photodetector 160. Accordingly, by passing the input light (i.e., the light input to the sensing loop 114) and the output light (i.e., the light output from the sensing loop 114) through the same polarizer 190, only a single optical path is utilized for propagating the light waves. Thus, non-reciprocity caused by the different propagation velocities of the two polarization modes is eliminated. The single mode optical fiber 112 is preferably a highly birefringent optical fiber having two well-defined polarization modes, and the polarizer is adjusted to select light propagating in one of the two polarization modes. If non-birefringent fiber is used, it may be preferable to include a pair of polarization controllers (not shown) to adjust the polarization of the input optical signal and the polarization of the light propagating in the sensing loop so that the polarization is aligned with the polarization axis of the polarizer 190, thereby reducing optical power loss in the polarizer 190.

As set forth in U.S. Pat. No. 4,529,312, which is incorporated by reference herein, reciprocity may also be achieved through the use of unpolarized light. It has been found that unpolarized light causes the non-reciprocal phase errors to cancel.

As further illustrated in FIG. 1, a phase modulator 192 is formed on the optical fiber 112 proximate to the fourth port 178 of the second directional coupler 170 between the fourth port 178 and the sensing portion 114. The phase modulator 192 is electrically connected to and driven by an electrical signal generator 194 via a signal line 196. The signal generator 194 generates an AC electrical signal at a frequency $f_m$. The phase modulator 192 may comprise a PZT cylinder, around which a portion of the first optical fiber 112 is wrapped. The first optical fiber 112 is bonded to the PZT cylinder so that when the PZT cylinder expands radially in response to an electrical modulating signal from the signal generator 194, the portion of the first optical fiber bonded to the PZT cylinder stretches. Other modulators, such as electro-optic modulators, can also be used.

Figure 2:
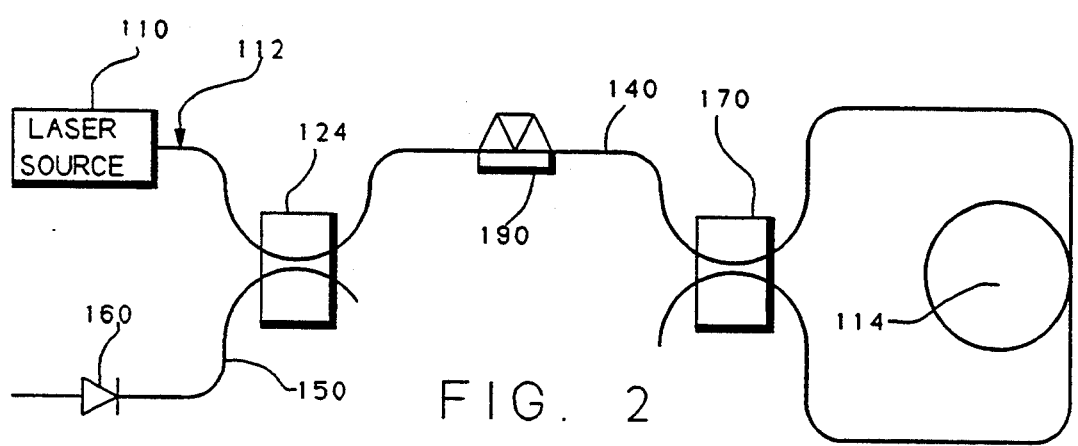
FIG. 2 is a schematic drawing of the interferometer of FIG. 1 with the phase modulator removed therefrom.

In order to understand the function of the phase modulator 192, the operation of the rotation sensor 100 will first be described as if the phase modulator 192 were not present. For the purposes of this discussion, the rotation sensor 100 is illustrated in FIG. 2 without the phase modulator 192. As set forth above, light from the source 110 traverses the sensing loop 114 and is combined to form an optical output signal that is detected by the photodetector 160.

The intensity of the optical output signal received by the photodetector 160 will vary in accordance with the amount and type of interference (i.e., constructive or destructive) between the two counterpropagating light waves $W_1$ and $W_2$ when they are recombined at the second directional coupler 170. Assuming the sensing loop 114 is at rest (i.e., is not rotating), the two waves $W_1$ and $W_2$ travel the same optical path around the sensing loop 114. Thus, when the two waves $W_1$ and $W_2$ are recombined at the second directional coupler 170, they will interfere constructively, with no phase difference therebetween, and the intensity of the optical output signal detected by the photodetector 160 will be at a maximum. However, when the sensing loop 114 is rotated, the counterpropagating light waves $W_1$ and $W_2$ will be shifted in phase in accordance with the Sagnac effect, so that when they are superimposed at the second directional coupler 170, they destructively interfere, thereby causing a reduction in the intensity of the optical output signal and thus reducing the magnitude of the electrical output signal generated by the photodetector 160. The Sagnac phase difference between the light waves $W_1$ and $W_2$ is defined by the following relationship:

$$\Delta \Phi_R = \frac{8\pi NA}{\lambda c} \times Q \qquad (1)$$

where:
$\Delta\Phi_R$ is the Sagnac phase difference caused by rotation of the optical loop;
A is the area bounded by the optical loop in which the light waves counterpropagate;
N is the number of times that the light waves propagate around the loop before being recombined;
Q is the angular velocity of the loop about an axis that is perpendicular to the plane of the loop; and
$\lambda$ and c are the free space values of the wavelength and velocity, respectively, of the light waves applied to the optical loop.

The intensity of the optical output signal is a function of the Sagnac phase difference $\Delta\Phi_R$ between the two counterpropagating light waves as follows:

$$I_T = I_1 + I_2 + 2\sqrt{I_1 I_2} \times \cos(\Delta\Phi_R) \qquad (2)$$

where $I_T$ is the intensity of the optical output signal, and $I_1$ and $I_2$ are the individual intensities of the two counterpropagating light waves.

Figure 3:
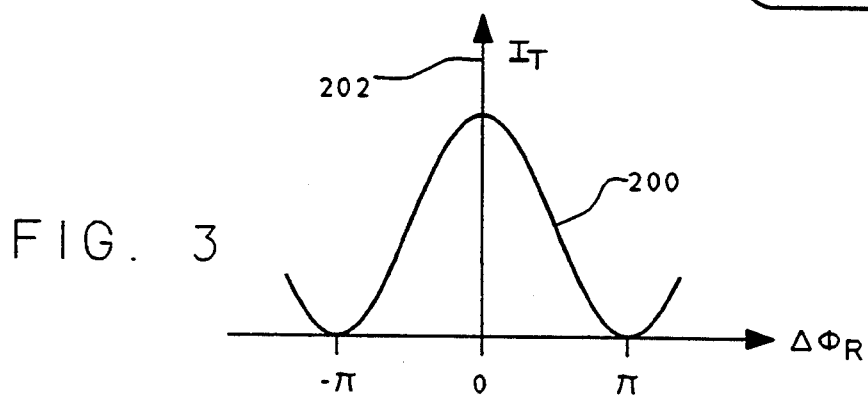
FIG. 3 is a graph of the intensity of the optical output signal, as measured by the photodetector, as a function of the rotationally-induced Sagnac phase difference.

From Equations 1 and 2, it may be seen that the intensity of the optical output signal is a function of the rotation rate Q. Thus, an indication of the rotation rate Q may be obtained by measuring the intensity of the optical output signal by using the photodetector 160. FIG. 3 shows a curve 200 that illustrates the relationship between the intensity $I_T$ of the optical output signal and the Sagnac phase difference $\Delta\Phi_R$ between the two counterpropagating light waves $W_1$ and $W_2$. The curve 200 has the shape of a cosine curve in accordance with Equation 2, and the intensity of the optical output signal is at a maximum when the Sagnac phase difference $\Delta\Phi_R$ is zero or an even multiple of $\pi$ (i.e., ... $-4\pi$, $-2\pi$, 0, $2\pi$, $4\pi$ ...) and at a minimum when the Sagnac phase difference $\Delta\Phi_R$ is a odd multiple of $\pi$ (i.e., ... $-3\pi$, $-\pi$, $\pi$, $3\pi$, $5\pi$ ...). When the phase difference between the counterpropagating waves is caused entirely by rotation of the sensing loop 114, the curve 200 will vary symmetrically about a vertical axis 202.

Referring to FIG. 3, it can be seen that, because the curve 200 is a cosine function, the intensity of the optical output signal detected by the photodetector 160 is highly nonlinear for large Sagnac phase differences $\Delta\Phi_R$ between the two counterpropagating light waves $W_1$ and $W_2$. Furthermore, the optical output signal intensity is relatively insensitive to changes in phase difference for small changes in the value of $\Delta\Phi_R$. Such nonlinearity and insensitivity makes it very difficult to transform the intensity $I_T$ of the optical output signal, as measured by the photodetector 160, into a signal that is indicative of the rate of rotation of the sensing loop 114 in accordance with Equations 1 and 2. For example, assuming that the horizontal axis of the FIG. 3 to the right of the vertical axis 202 represents Sagnac phase differences $\Delta\Phi_R$ caused by clockwise rotation of the sensing loop 114 and that the horizontal axis to the left of the vertical axis 202 represents Sagnac phase differences $\Delta\Phi_R$ caused by counterclockwise rotation of the sensing loop 114, it can be seen that the direction of rotation cannot be determined by simply measuring the intensity of the optical output signal since the intensity is symmetrical about the vertical axis 202 and is the same for equal rotation rates in either direction.

A number of devices and techniques have been used to measure the rotation rate by modulating the phases of the two counterpropagating light waves $W_1$ and $W_2$ such that the intensity of the optical output signal detected by the photodetector 160 includes sufficient information so that small rotation rates can be measured and so that rotation in the clockwise direction can be distinguished from rotation in the counterclockwise direction. For example, U.S. Pat. Nos. 4,410,275; 4,456,377; 4,529,312; 4,634,282; 4,637,722; 4,687,330; 4,728,192; and 4,707,136, which are incorporated herein by reference, disclose devices and techniques for modulating the phase of the counterpropagating light waves in a sensing loop and for determining the rotation rate from the intensity of the optical output signal.

Figure 4:
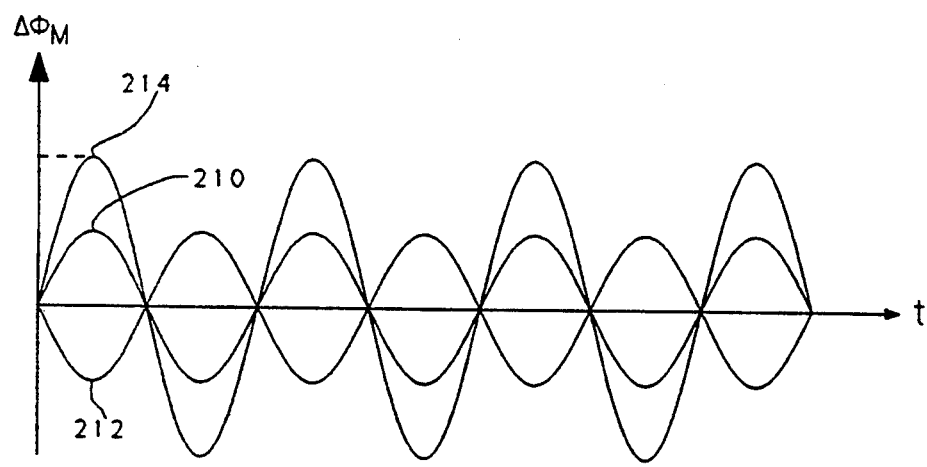
FIG. 4 is a graph of phase difference as a function of time, showing the phase modulation of each of the counterpropagating light waves and the phase difference between the counterpropagating light waves.

Referring to FIG. 4, the phase modulator 192 modulates the phase of each of the counterpropagating light waves $W_1$ and $W_2$ at the frequency of the signal generator 194. As set forth above, the phase modulator 192 is preferably located proximate to the second directional coupler 170, near one end of the sensing loop 114. Thus, the modulation of the clockwise propagating light wave $W_1$ is not necessarily in phase with the modulation of the counterclockwise propagating light wave $W_2$. The modulation of the light wave $W_1$ is typically 180 degrees out of phase with the modulation of the light wave $W_2$. This is illustrated in FIG. 4, wherein the modulation of the phase of the light wave $W_1$ is represented by a sinusoidal curve 210 that is 180 degrees out of phase with a sinusoidal curve 212 that represents the modulation of the phase of the light wave $W_2$. Use of a modulation frequency that provides such 180-degree phase difference between the modulation of the light wave $W_1$ relative to that of the light wave $W_2$ is particularly advantageous because it eliminates the effects of modulator induced amplitude modulation in the optical output signal measured by the photodetector 160. The preferred modulation frequency $f_m$ that provides such 180-degree phase difference between the modulations of the two light waves may be calculated in accordance with the following equation:

$$f_m = \frac{c}{2n_{eq}L} \quad (3)$$

where:

L is the differential fiber length between the second directional coupler 170 and the phase modulator 192 for the counterpropagating light waves $W_1$ and $W_2$, i.e., the distance, measured along the fiber, between the phase modulator 192 and a symmetrical point on the opposite end of the sensing loop 114;

$n_{eq}$ is the equivalent refractive index for the optical fiber 112; and c is the free space velocity of the light applied to the sensing loop 114.

At the selected modulation frequency $f_m$, which is often called the "proper frequency", the phase difference $\Delta\Phi_M$ between the two counterpropagating light waves $W_1$ and $W_2$ caused by the phase modulation of the two light waves is illustrated by a sinusoidal curve 214 in FIG. 4. The curve 214 is obtained by subtracting the curve 212 from the curve 210 to obtain the phase difference between the light wave $W_1$ and the light wave $W_2$. The modulation of the phase difference between the light wave $W_1$ and the light wave $W_2$ also modulates the intensity $I_T$ of the optical output signal in accordance with the curve 200 of FIG. 3. Such phase modulation $\Delta\Phi_M$ is indistinguishable from rotationally-induced Sagnac phase difference $\Delta\Phi_R$.

Figure 5:
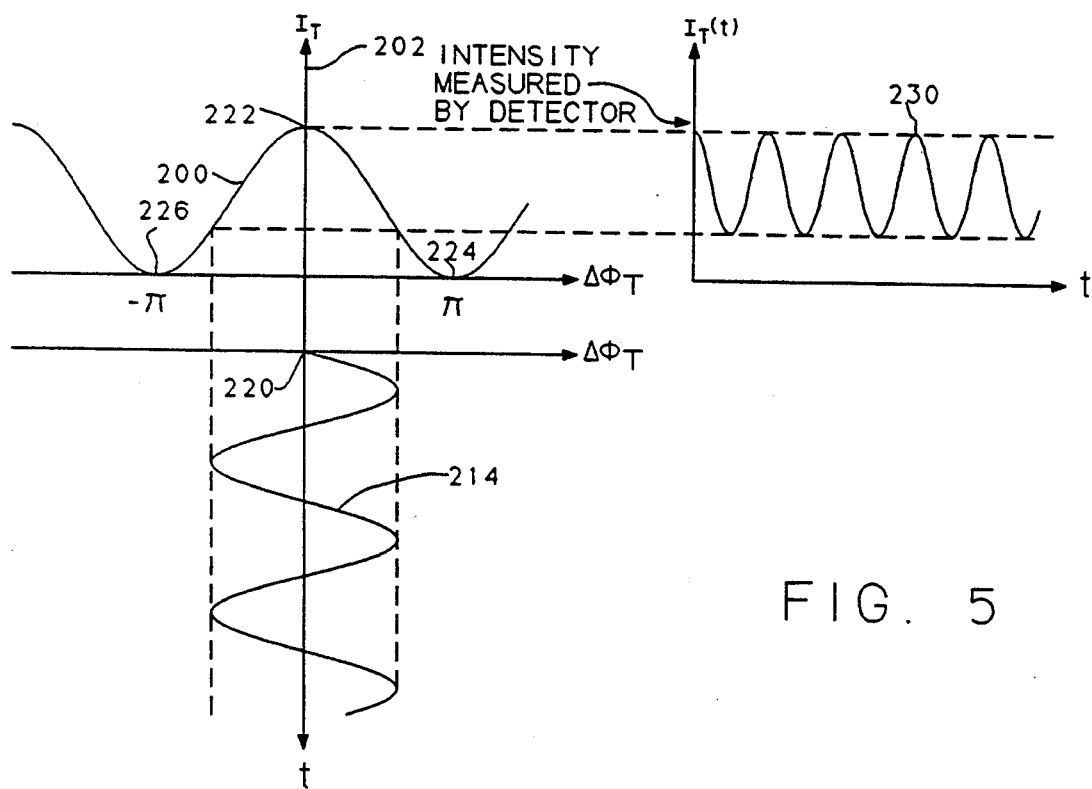
FIG. 5 is a schematic drawing illustrating the effect of the phase modulation upon the intensity of the optical output signal, as measured by the photodetector, when the sensing loop is not rotating.
Figure 6:
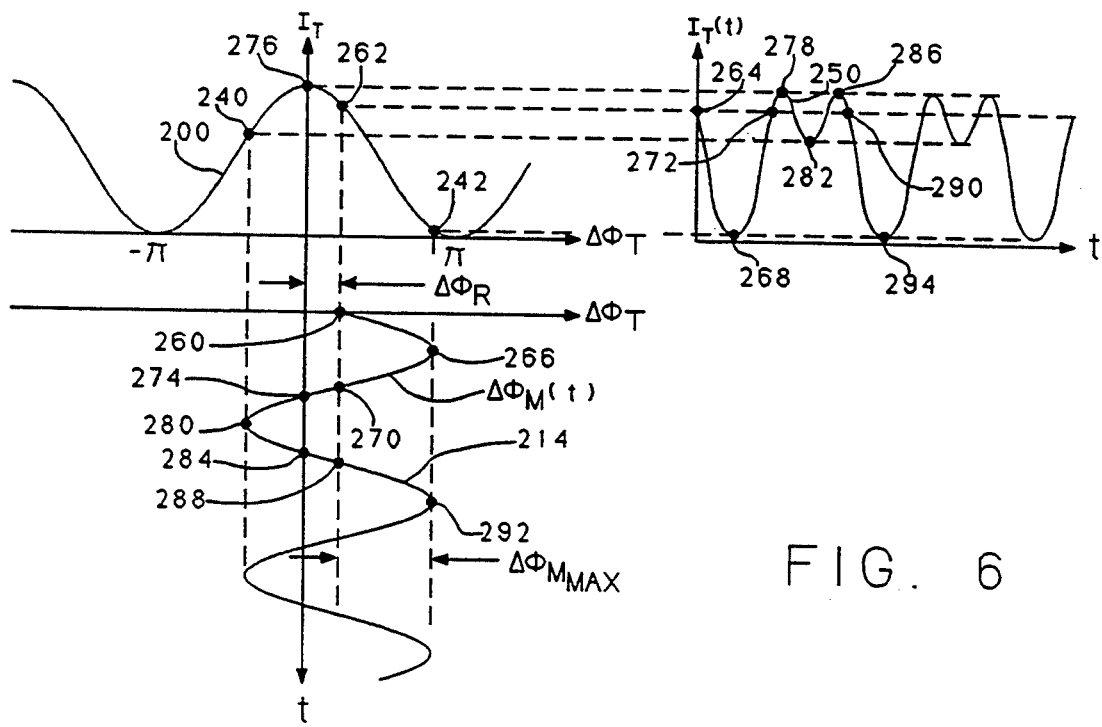
FIG. 6 is a schematic drawing showing the effect of the phase modulation upon the intensity of the optical output signal, as measured by the detector, when the sensing loop is rotating in a first direction.

The foregoing may be more fully understood by referring to FIGS. 5 and 6 which graphically illustrate the combined effect of the phase modulation $\Delta\Phi_M$, defined by the curve 214 of FIG. 4, and the rotationally-induced Sagnac phase difference $\Delta\Phi_R$, upon the intensity $I_T$ of the optical output signal. It should be understood that the intensity $I_T$ is a function of the total phase difference between the light waves $W_1$ and $W_2$, and that the total phase difference comprises both the rotationally-induced Sagnac phase difference $\Delta\Phi_R$ and the time-varying modulation-induced phase difference $\Delta\Phi_M$. The total phase difference $\Delta\Phi_T$ between the two light waves $W_1$ and $W_2$ may be expressed as follows:

$$\Delta\Phi_T = \Delta\Phi_R + \Delta\Phi_M \quad (4)$$

As indicated above, the effects of the modulation-induced phase difference $\Delta\Phi_M$, as well as the rotationally-induced phase difference $\Delta\Phi_R$, will be considered in reference to FIGS. 5 and 6. Accordingly, the horizontal axis for the graph of the curve 200 in FIGS. 5 and 6 has been labelled as $\Delta\Phi_T$ to indicate that the total phase difference is being considered, rather than only the rotationally-induced phase difference $\Delta\Phi_R$, as in FIG. 3.

Referring now to FIG. 5, the effect of the phase modulation $\Delta\Phi_M$ (represented by the curve 214) upon the intensity $I_T$ will be first discussed. The curve 200 represents the relationship between (1) the intensity of the optical output signal resulting from interference of the two waves $W_1$ and $W_2$ at the coupler 170, and (2) to the phase difference $\Delta\Phi_T$ between the two light waves at the coupler 170. When the modulation-induced phase difference $\Delta\Phi_M$ between the two light waves is zero, as illustrated at a location 220 on the curve 214 in FIG. 5, the resultant intensity $I_T$ of the combined light waves is a maximum, as illustrated at the location 222 on the curve 200. When the relative phase angle between the two light waves $W_1$ and $W_2$ is non-zero, the combined optical signal will have a lower intensity, depending upon the magnitude of the phase difference $\Delta\Phi_M$. The intensity continues to decrease with increasing $\Delta\Phi_M$ until the relative phase difference $\Delta\Phi_M$ is either plus or minus 180 degrees, as illustrated at a location 224 and at a location 226, respectively, in FIG. 5. At a phase difference of plus or minus 180 degrees (i.e., $+\pi$ or $-\pi$), the two counterpropagating light waves completely destructively interfere, and the resultant intensity is zero, as illustrated at the location 224 and the location 226. Since the curve 200 is a periodic function of the total phase difference $\Delta\Phi_T$, if the total phase difference $\Delta\Phi_T$ is increased beyond $+\pi$ or $-\pi$, the intensity will increase, as further illustrated in FIG. 5.

In FIG. 5, it is assumed that the sensing loop 114 is at rest, and thus, the optical output signal is not affected by the Sagnac effect. Specifically, it may be seen that the modulation-induced phase difference curve 214 causes the intensity $I_T$ of the optical output signal to vary in time, as illustrated by an intensity curve 230 in FIG. 5. The intensity curve 230 is obtained by translating the points on the curve 214 (representing the instantaneous modulation phase difference $\Delta\Phi_M$ between the two light waves $W_1$ and $W_2$) onto the curve 200 (representing the resultant optical intensity for a phase difference of that magnitude). When all the points on the curve 214 are translated onto the curve 200, and the corresponding intensities are plotted, the curve 230 results. At zero rotation, the translation of the curve 214 through the curve 200 is symmetrical about the vertical axis 202 of the curve 200. Thus, the optical intensity represented by the curve 230, and measured by the photodetector 160, varies periodically at a frequency equal to the second harmonic of the modulating frequency $f_m$ and will comprise only even harmonics of the frequency $f_m$.

When the sensing loop 114 is rotated, the counterpropagating light waves $W_1$ and $W_2$ are shifted in phase in accordance with the Sagnac effect, as discussed above. The Sagnac phase shift provides a constant phase difference $\Delta\Phi_R$ for a constant rotational velocity. The Sagnac phase shift adds to the phase difference $\Delta\Phi_M$ caused by the phase modulator 192 so that the entire curve 214 is translated in phase from the position shown in FIG. 5 by an amount equal to $\Delta\Phi_R$, as illustrated in FIG. 6. The addition of the rotationally-induced phase difference to the modulator-induced phase difference causes the intensity $I_T$ of the optical output signal to vary nonsymmetrically along the curve 200 between a point 240 and a point 242, and thus causes the optical output signal to have a time-varying intensity as illustrated by a curve 250 in FIG. 6.

The curve 250 can be obtained by translating points on the curve 214 onto the curve 200, as discussed above in connection with FIG. 5. For example, the combined phase difference $\Delta\Phi_T$, illustrated at a location 260 on the curve 214, translates through a location 262 on the curve 200 to a location 264 on the curve 250. It should be understood that the location 264 corresponds in time to the location 260 and corresponds in amplitude to the location 262. Similarly, a location 266 on the curve 214 translates through the location 242 on the curve 200 to a location 268 on the curve 250; a location 270 on the curve 214 translates through the location 262 on the curve 200 to a location 272 on the curve 250; a location 274 on the curve 214 translates through a location 276 on the curve 200 to a location 278 on the curve 250; a location 280 on the curve 214 translates through the location 240 on the curve 250 to a location 282 on the curve 250; a location 284 on the curve 214 translates through the location 276 on the curve 200 to a location 286 on the curve 250; a location 288 on the curve 214 translates through the location 262 on the curve 200 to a location 290 on the curve 250; and a location 292 on the curve 214 translates through the location 242 on the curve 200 to a location 294 on the curve 250. It can be seen that after the curve 214 completes one cycle, for example, from the location 260 to the location 288, and begins repeating, the corresponding locations on the curve 250 also repeat.

Figure 7:
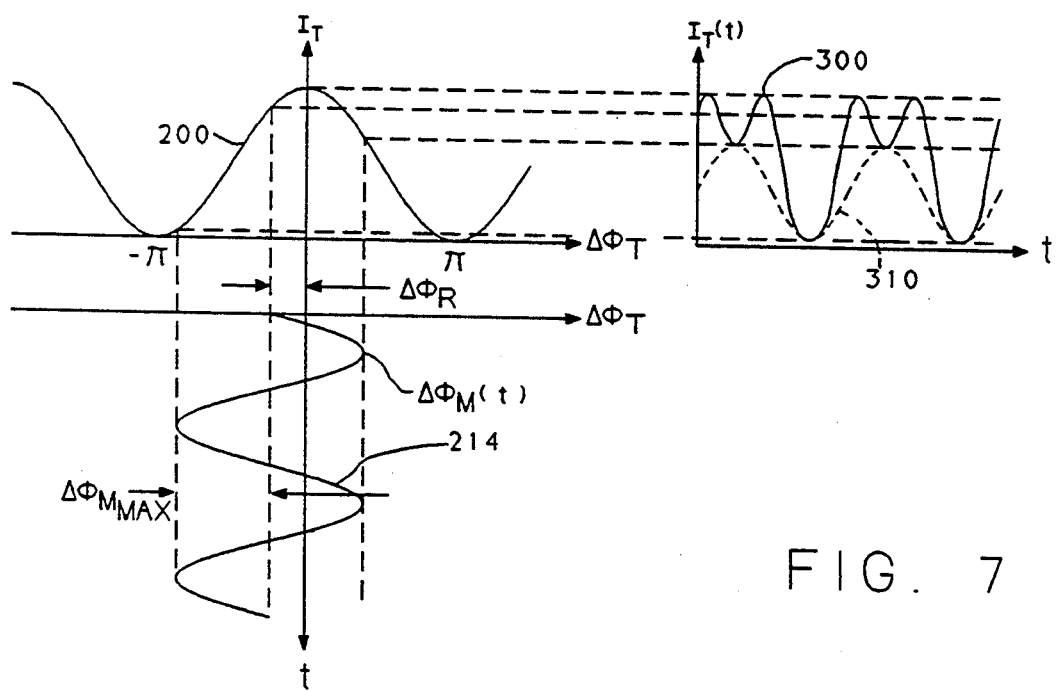
FIG. 7 is a schematic drawing showing the effect of the phase modulation upon the intensity of the optical output signal, as measured by the detector, when the sensing loop is rotating in a second direction, opposite the first direction.

FIG. 7 illustrates a curve 300 for the optical output signal when the phase difference $\Delta\Phi_R$ results from rotation in the opposite direction to the rotation in FIG. 6 and thus causes the curve 214 to be shifted in the opposite direction along the $\Delta\phi_T$ axis. It can be seen that for substantially the same magnitude of Sagnac phase shift $\Delta\Phi_R$, the curve 300, representing the intensity of the optical output signal, is substantially similar to the curve 250 in FIG. 6; however, the curve 300 is shifted in phase with respect to the curve 250.

Figure 8:
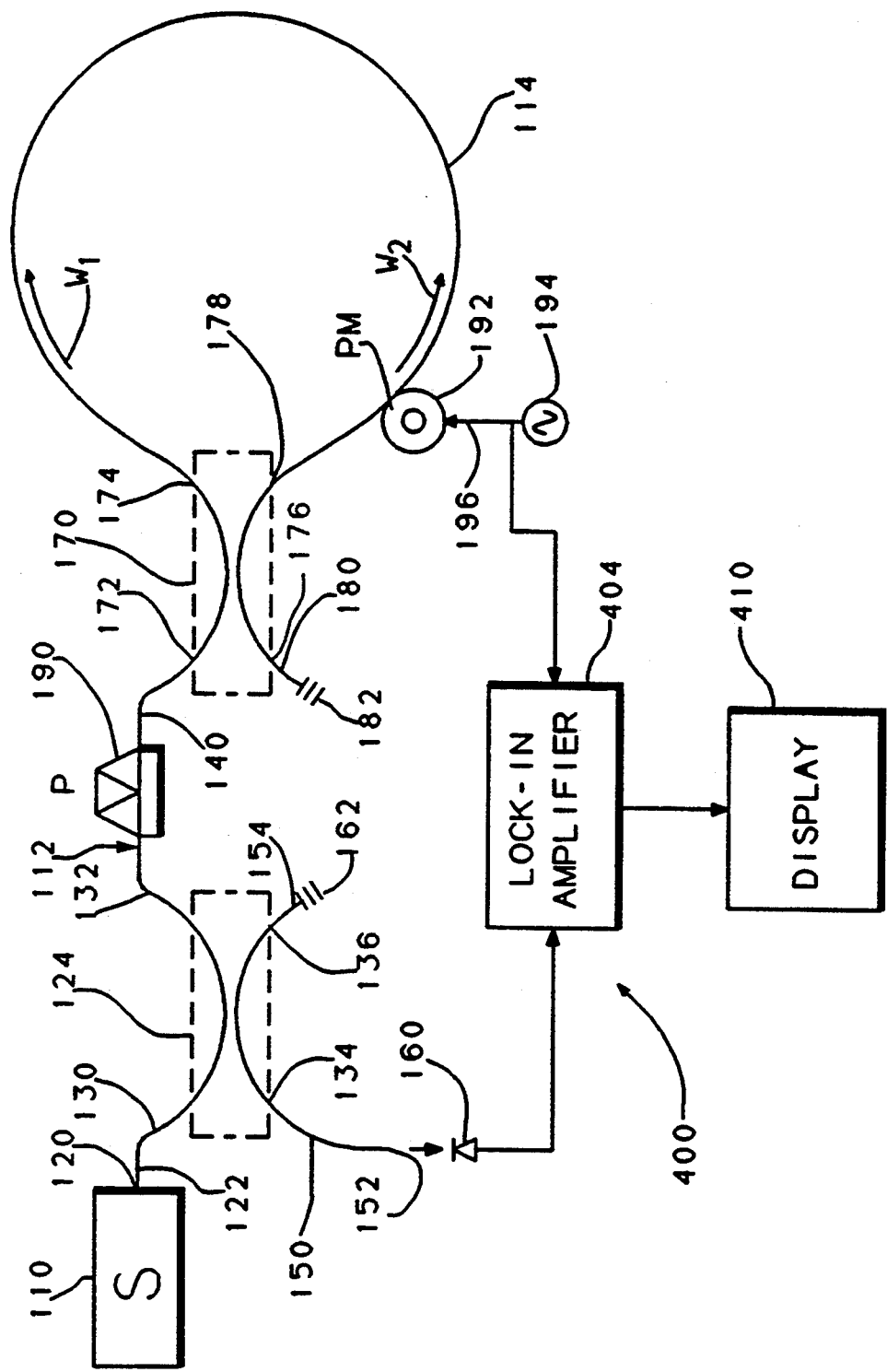
FIG. 8 illustrates the known rotation sensor of FIG. 1 wherein the processing circuitry comprises a lock-in amplifier that provides an output signal responsive to the first harmonic component of the optical output signal and a display device connected to the output of the lock-in amplifier to display the rotation rate.

The optical output signal has a first harmonic component as illustrated by sinusoidal curve 310 (shown in phantom) in FIG. 7. The amplitude of this first harmonic component is indicative of the rotationally-induced Sagnac phase shift. Thus, by detecting this first harmonic, an indication of the rotation rate of the sensing loop 114 may be obtained. An example of a previous rotation sensor that utilizes this technique is illustrated in FIG. 8 as a rotation sensor 400. The rotation sensor 400 is similar to the rotation sensor 100 of FIG. 1 except that the processing circuitry is shown in more detail as a commercially available lock-in amplifier 404 and a display device 410. As is well known in the art, in the rotation sensor 400, the lock-in amplifier 404 receives the output of the photodetector 160 as one input and receives the output of the signal generator 194 as a second input. As discussed above, the output of the signal generator 194 has a frequency $f_m$. The output of the signal generator 194 serves as a reference signal to the lock-in amplifier 404 so that the lock-in amplifier 404 synchronously detects the first harmonic component (i.e., the component at the frequency $f_m$) of the electrical representation of the optical output signal to provide an amplified output signal having a value proportional to the RMS value of the first harmonic component of the optical output signal. The amplified output signal is provided to the display device 410 where it is displayed as a numeric value to indicate the rotation rate of the sensing loop. The display device 410 may include, for example, a look-up table to convert the output of the lock-in amplifier 404 to a rotation rate and direction.

The present invention provides an apparatus and method for determining the direction and rate of rotation of the sensing loop 114 that utilizes a digital phase lock loop in combination with a waveform synthesizer to replace the lock-in amplifier described above. The present invention is described in connection with FIGS. 9-27, which are discussed in detail below.

Figure 9:
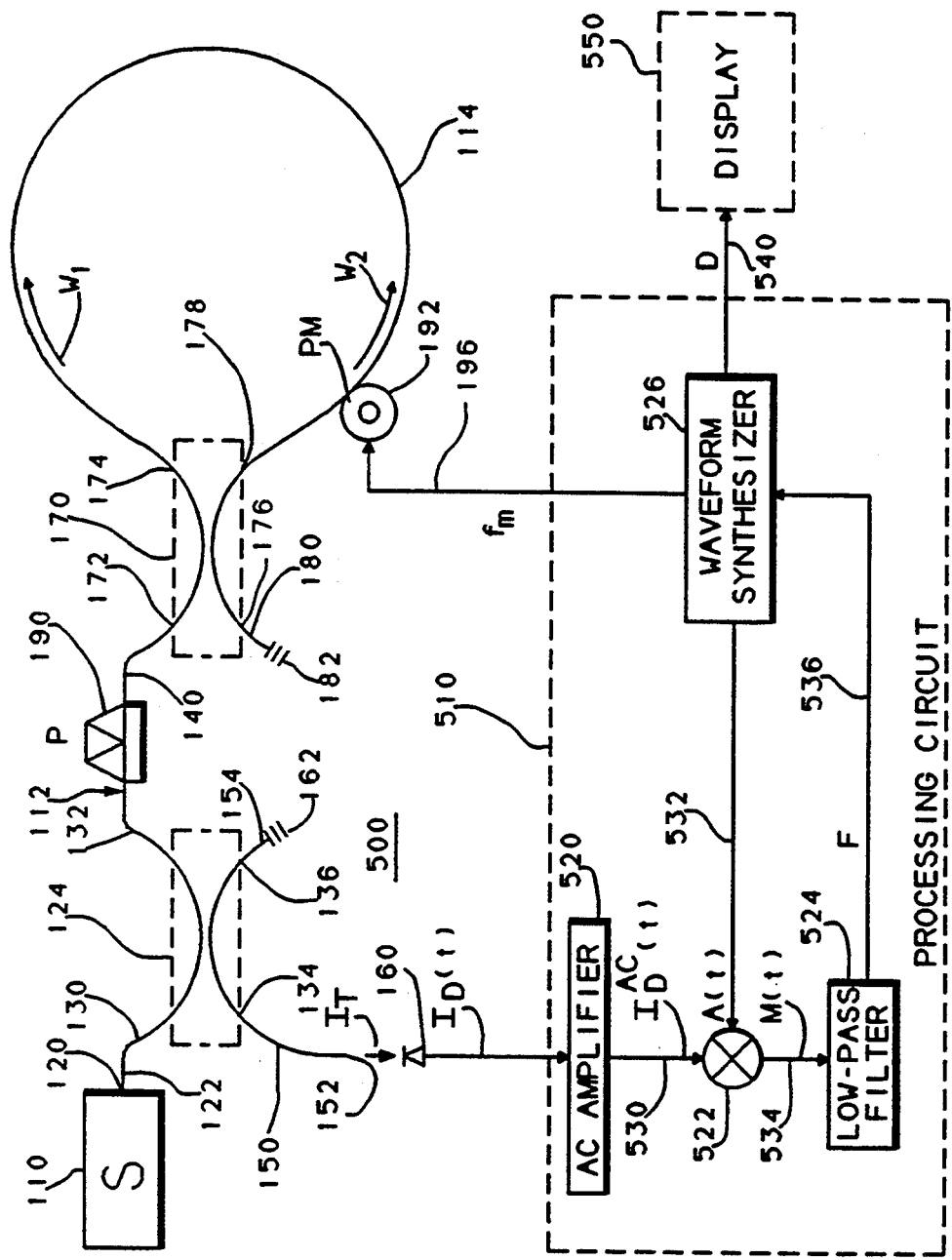
FIG. 9 illustrates an improved rotation sensor 500 in accordance with the present invention.

FIG. 9 illustrates an improved rotation sensor 500 in accordance with the present invention. As illustrated, the optical components of rotation sensor 500 correspond to the optical components of the known rotation sensor 100 of FIG. 1, and like components are identified with like numeric designators. Unlike the rotation sensor 100 of FIG. 1, the rotation sensor 500 of FIG. 9 includes a unique processing circuit 510 that comprises an AC amplifier 520, a multiplier 522, a low-pass filter 524 and a digital waveform synthesizer 526. The photodetector 160 provides an electrical output signal, as before, which is designated as $I_D(t)$ in FIG. 9. The AC amplifier 520 amplifies the AC components of the electrical output signal $I_D(t)$ and provides an AC output signal $I_D^{AC}(t)$ on a signal line 530 that has no DC components. The AC components of the AC output signal $I_D^{AC}(t)$ have frequencies that correspond to the fundamental and harmonic frequencies of the phase modulation $\Delta\Phi_M$ generated by the phase modulator 192 in response to the signal from the waveform synthesizer 526. As discussed above, the particular harmonics that are present in the electrical output signal from the photodetector 160 will vary in accordance with the rotation rate and the amplitude of the phase modulation $\Delta\Phi_M$.

The AC output signal $I_D^{AC}(t)$ on the line 530 is provided as one input to the multiplier 522. The multiplier 522 has a second input which is connected via a signal line 532 to the output of the waveform synthesizer 526. The multiplier 522 provides a multiplier output signal M(t) on a signal line 534 that is provided as the input to the low-pass filter 524. As will be discussed in more detail below, the multiplier output signal M(t) includes DC components that are passed through the low-pass filter 524 and are provided as a low-pass filter output signal F on a signal line 536. The low-pass filter output signal F is provided as an input to the waveform synthesizer 526. The waveform synthesizer 526 generates the reference signal output $f_m$ to the phase modulator 192 via the signal line 196.

The waveform synthesizer 526 responds to the amplitude (i.e., sign and magnitude) of the low-pass filter output signal and generates a synthesized waveform A(t) as an output signal on the signal line 532. The synthesized waveform A(t) comprises selected harmonics of the frequency $f_m$ of the reference signal. The synthesized waveform A(t) is provided as the second input to the multiplier 522 and is multiplied by the AC output signal $I_D^{AC}(t)$ on the line 530. As will be discussed in detail below, the waveform synthesizer 526 operates to cause the synthesized waveform A(t) to comprise selected harmonics of the frequency $f_m$ such that the amplitude of the low-pass filter output signal F on the line 536 will be substantially equal to zero. That is, the waveform synthesizer 526 will respond to any non-zero value of the low-pass filter output signal F and generate a synthesized waveform A(t) that, when multiplied by the AC output signal $I_D^{AC}(t)$ on the line 530, will generate a multiplier output signal M(t) that has substantially zero DC component. Thus, the loop comprising the multiplier 522, the low-pass filter 524 and the waveform synthesizer 526 operates as a digital phase-lock loop.

The waveform synthesizer 526 also provides a digital output signal D on a bus 540 that is responsive to the harmonic content of the synthesized waveform A(t) generated on the line 532 and is thus responsive to the rotation rate of the loop 114. The digital output signal D on the bus 540 can be advantageously provided as an input to a display device 550 (shown in phantom) or to other electronic circuitry that may utilize the rotation rate signal (e.g., navigation computers, or the like).

In order to understand the operation of the present invention, it is helpful to first obtain a mathematical expression for the harmonic components of the electrical output signal from the photodetector 160. It is known, for example, that the detector current $I_D$ from the photodetector 160 corresponding to the intensity $I_T$ of the optical output signal incident on the photodetector can be represented as:

$$I_D(t) = \frac{I_0}{2} [1 + \cos(\phi_m \sin\omega_m t + \phi_R)] \quad (5)$$

where $I_0$ is the peak detector current which is responsive to the peak optical output signal, $\phi_m$ corresponds to the maximum amplitude of the modulation induced phase difference $\Delta\Phi_M$ in the optical output signal incident on the photodetector 160, $\phi_R$ corresponds to the rotation induced phase difference $\Delta\Phi_R$ in the optical output signal incident on the photodetector 160, and $\omega_m$ is equal to $2\pi f_m$. It should be noted that similar terminology is being used for the electrical output signal from the photodetector 160 as was used above with respect to the intensity of the optical output signal since the magnitude of the electrical output signal is proportional to the intensity of the optical output signal.

Using the relationship;

$$\cos(\alpha+\beta) = \cos\alpha\cos\beta - \sin\alpha\sin\beta$$

Equation (5) for the electrical output signal can be expanded mathematically as:

$$I_D(t) = \frac{I_0}{2} [1 + \cos(\phi_m \sin\omega_m t)\cos\phi_R - \sin(\phi_m \sin\omega_m t)\sin\phi_R] \quad (6)$$

Equation (6) can be further expanded to:

$$I_D(t) = \quad (7)$$

$$\frac{I_0}{2}\left[ 1 + \left( J_0(\phi_m) + 2\sum_{n=1}^{\infty} J_{2n}(\phi_m)\cos(2n\omega_m t) \right)\cos\phi_R - 2\left( \sum_{n=1}^{\infty} J_{2n-1}(\phi_m)\sin((2n-1)\omega_m t) \right)\sin\phi_R \right]$$

The terms in Equation (7) can be grouped as:

$$I_D(t) = \quad (8)$$

$$\frac{I_0}{2}[1 + J_0(\phi_m)\cos\phi_R] + I_0\left[\sum_{n=1}^{\infty} J_{2n}(\phi_m)\cos(2n\omega_m t)\cos\phi_R - \sum_{n=1}^{\infty} J_{2n-1}(\phi_m)\sin((2n-1)\omega_m t)\sin\phi_R\right]$$

The first set of terms in Equation (8), $$\frac{I_0}{2}[1 + J_0(\phi_m)\cos\phi_R],$$

are DC terms (the rotation induced phase shift $\phi_R$ varies very slowly relative to the reference frequency $f_m$) and are eliminated by the AC amplifier 520. Thus, the AC output signal $I_D^{AC}(t)$ from the AC amplifier 520 comprises only the harmonics of the reference frequency $f_m$:

$$I_D^{AC}(t) = I_0\left[\sum_{n=1}^{\infty} J_{2n}(\phi_m)\cos(2n\omega_m t)\cos\phi_R - \sum_{n=1}^{\infty} J_{2n-1}(\phi_m)\sin((2n-1)\omega_m t)\sin\phi_R\right] \quad (9)$$

Figure 10A:
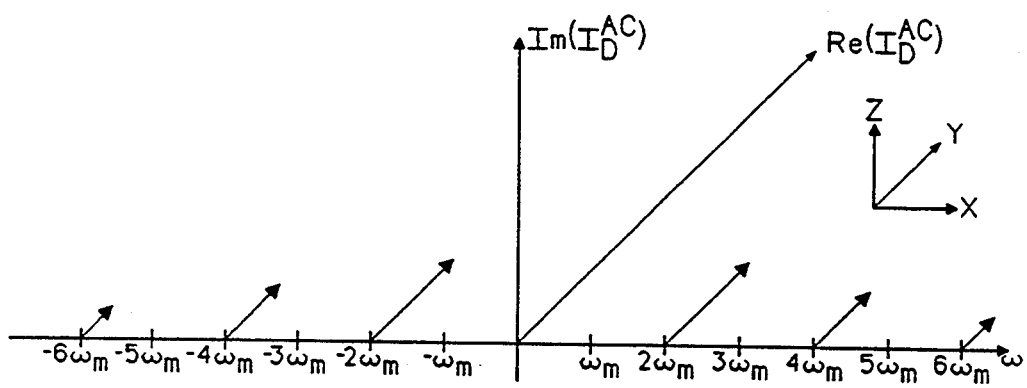
FIG. 10A is a two-dimensional representation of a three-dimensional graph of the amplitudes of the detected output signal at the odd and even harmonics of the reference frequency $f_m$ for a rotation rate that results in 0 or a multiple of $\pi$ Sagnac induced phase difference, wherein the X-axis represents the harmonic frequency, the Y-axis represents the real part of the complex frequency spectrum of the detected output signal, and the Z-axis represents the imaginary part of the complex frequency spectrum of the detected output signal, showing that only even harmonics are present, which, in this convention are shown along the real axis.
Figure 10B:
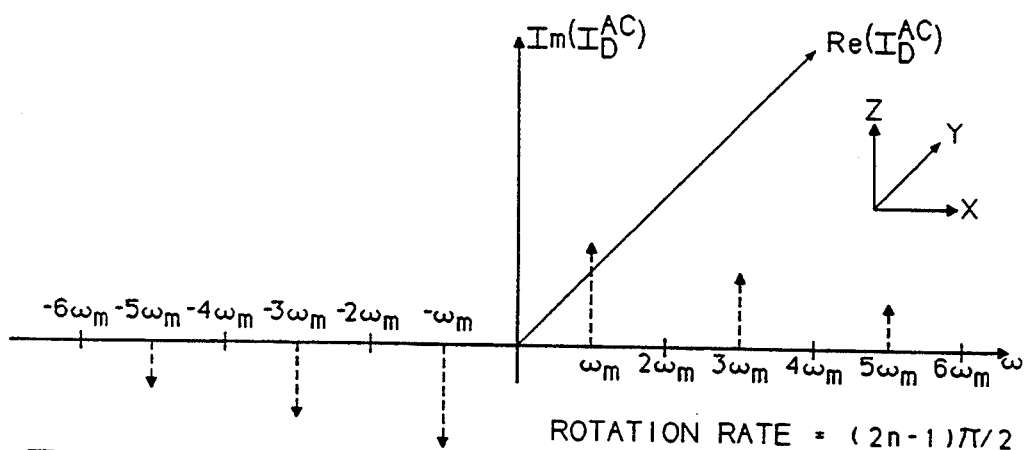
FIG. 10B is similar to FIG. 10A for a rotation rate that results in odd multiples of $\pi/2$ Sagnac induced phase difference, showing that only the odd harmonics are present.
Figure 10C:
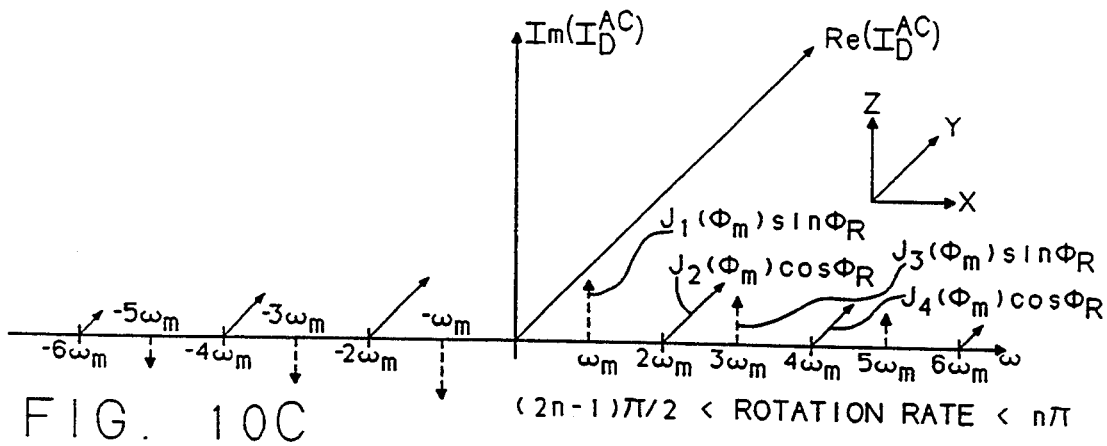
FIG. 10C is similar to FIGS. 10A and 10B for a rotation rate that results in a Sagnac induced phases difference that is neither a multiple of $\pi$ nor a multiple of $\pi/2$ showing that both the even and odd harmonics are present.

It can be seen, for example, that when the rotation induced phase shift is equal to 0 or an odd or even multiple of $\pi$, the $\sin\Phi_R$ term is zero and the AC output signal $I_D^{AC}(t)$ comprises only even harmonics of the reference frequency $\omega_m$. In contrast, when the rotation induced phase shift is equal to an odd multiple of $\pi/2$, the AC output signal $I_D^{AC}(t)$ comprises only odd harmonics of the reference frequency $\omega_m$. At other rotation induced phase shifts, the AC output signal $I_D^{AC}(t)$ comprises both odd and even harmonics of the reference frequency that have magnitudes that vary in accordance with the rotation induced phase shift. This is illustrated in FIGS. 10A, 10B and 10C which are pictorial representations of three-dimensional graphs. In the convention chosen for FIGS. 10A, 10B and 10C, each graph has an X-axis that represents the frequency $\omega$, a Y-axis or real ("Re") axis that represents the magnitudes of the even harmonics of the reference frequency $\omega_m$, and a Z-axis or imaginary ("Im") that represents the odd harmonics. As illustrated in FIG. 10A, when the rotation rate is zero or another multiple of $n\pi$ (e.g., 0, $\pi$, $2\pi$, $3\pi$, etc.) the AC output signal comprises only even harmonics of $\omega_m$ (e.g., $\pm 2\omega_m$, $\pm 4\omega_m$, $\pm 6\omega_m$, etc.). The magnitude of a particular harmonic depends upon the magnitude of the corresponding Bessel function. For example, the magnitude of the second harmonic is proportional to the second Bessel function $J_2(\phi_m)$. In FIG. 10B, when the rotation rate is an odd multiple of $\pi/2$ (e.g., $-3\pi/2$, $-\pi/2$, $\pi/2$, $3\pi/2$, $5\pi/2$, etc.) the AC output signal comprises only odd harmonics of $\omega_m$ (e.g., $\pm\omega_m$, $\pm 3\omega_m$, $\pm 5\omega_m$, etc.). Again, the magnitude of a harmonic depends upon the magnitude of the corresponding Bessel function. It should be understood that the magnitude of each term of the Bessel function depends upon the magnitude of the phase modulation induced by the waveform synthesizer 526. Thus, the Bessel function is shown as being a function of $\phi_m$.

It can be seen from Equation 9 above, that as the rotation rate increases from zero, the magnitudes of the even harmonic components decrease as $\cos\phi_R$ decreases and the magnitudes of the odd harmonic components increase as $\sin\Phi_R$ increases. For example, as illustrated in FIG. 10C, when the rotation rate is not equal to a multiple of $\pi$ or $\pi/2$, both the odd and even harmonics of the reference frequency $\omega_m$ are present. The magnitude of each harmonic depends upon both the corresponding Bessel function $J_n(\phi_m)$ and the respective sine or cosine of the rotation induced phase shift $\phi_R$. For example, the magnitude of the first harmonic is illustrated as being proportional to $J_1(\phi_m) \sin\phi_R$, and the magnitude of the second harmonic is illustrated as being proportional to $J_2(\phi_m) \cos\phi_R$. Thus, it can be seen that if the magnitudes of the harmonics are measured, the rotation induced phase shift can be determined. The rotation induced phase shift can in turn be used to determine the rotation rate.

The present invention provides an apparatus and method for indirectly measuring the magnitudes of the harmonic components and thus determining the direction and magnitude of the rotation induced phase shift. As set forth above, the waveform synthesizer 526 operates to generate the synthesized waveform A(t) that, when multiplied by the AC output signal $I_D{}^{AC}(t)$ will produce a multiplier output signal M(t) that has a substantially zero DC component. The principle of operation is based upon the multiplication of the harmonics in one signal by the harmonics in the other signal (i.e., the multiplication of the harmonics in the AC output signal $I_D{}^{AC}(t)$ by the harmonics in the synthesized waveform A(t)). It is known that the multiplication of the two sinusoids having the same frequency and phase results in a product having both a DC component as well as an AC component:

$$\sin\alpha \times \sin\alpha = \sin^2\alpha = \tfrac{1}{2} - \tfrac{1}{2}\cos 2\alpha \qquad (10)$$

and:

$$\cos\alpha \times \cos\alpha = \cos^2\alpha = \tfrac{1}{2} + \tfrac{1}{2}\cos 2\alpha \qquad (11)$$

On the other hand, the multiplication of two sinusoids having a different frequency or having the same frequency and a quadrature phase relationship (i.e., $\pi/2$ phase difference) results in a product having only AC components:

$$\sin\alpha \times \sin\beta = \tfrac{1}{2}\cos(\alpha-\beta) - \tfrac{1}{2}\cos(\alpha+\beta) \qquad (12)$$

and:

$$\sin\alpha \times \cos\alpha = \tfrac{1}{2}\sin 2\alpha \qquad (13)$$

Figure 11:
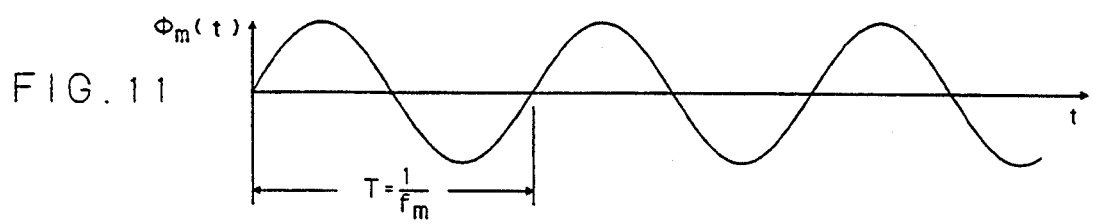
FIG. 11 illustrates an exemplary sinusoidal phase modulation signal at the frequency $f_m$.
Figure 12:
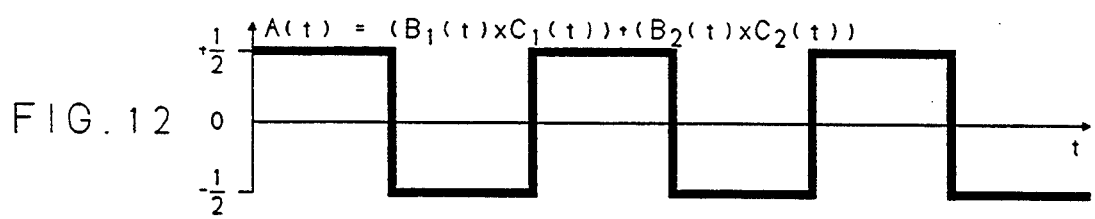
FIG. 12 illustrates an exemplary waveform for the output of the waveform synthesizer of FIG. 9 for a zero rotation rate or a rotation rate that induces a Sagnac phase shift that is a multiple of $\pi$.

The foregoing relationships are used in the present invention to measure the harmonic components of the AC output signal $I_D{}^{AC}(t)$ by generating a synthesized waveform A(t) that has harmonic components selected to generate a multiplier output signal M(t) that has a substantially zero DC value. The rotation rate is determined by measuring the DC component of the multiplier output signal M(t) (e.g., by measuring the output signal F from the low-pass filter 524), and adjusting the waveform synthesizer 526 until the DC component is substantially equal to zero. The magnitude and direction of the adjustment required is a measure of the rotation rate. As will be set forth below, in the preferred embodiment of the present invention, the adjustment is a phase shift introduced into two synthesized signals within the waveform synthesizer 526. The direction and magnitude of the phase shift are converted to a measure of the rotation rate. The operation of the waveform synthesizer can be understood by referring to FIGS. 11-28. FIG. 11 illustrates the sinusoidal phase modulation $\phi_m(t)$ induced in the counterpropagating optical signals in the loop 114. FIG. 12 illustrates an exemplary waveform A(t) for zero rotation rate or a rotation rate that induces a Sagnac phase shift that is a multiple of $\pi$. FIGS. 13, 14, 15 and 16 illustrate exemplary waveforms $B_1(t)$, $C_1(t)$, $B_2(t)$, $C_2(t)$, respectively, that are used to create the A(t) waveform of FIG. 12.

Figure 17:
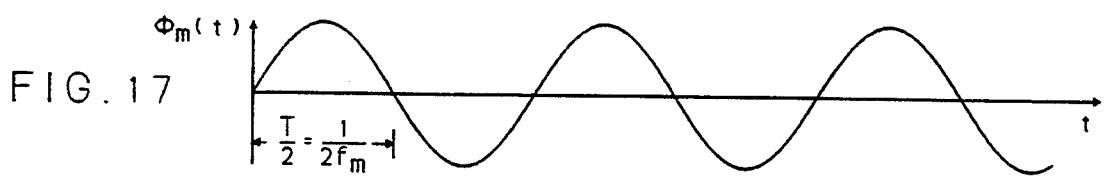
FIG. 17 illustrates an exemplary sinusoidal phase modulation signal at the frequency $f_m$.

Similarly, an exemplary waveform A(t) for a rotation rate that causes an odd multiple of $\pi/2$ phase shift is illustrated in FIG. 18, again referenced to the sinusoidal phase modulation signal $\phi_m(t)$ in FIG. 17. FIGS. 19, 20, 21 and 22 illustrate exemplary waveforms $B_1(t)$, $C_1(t)$, $B_2(t)$, $C_2(t)$, respectively, that are used to create the A(t) waveform of FIG. 18.

Finally, an exemplary waveform A(t) for a rotation rate that causes a phase shift between 0 and $\pi/2$ is illustrated in FIG. 24, again referenced to the sinusoidal phase modulation signal $\phi_m(t)$. FIGS. 25, 26, 27 and 28 illustrate exemplary waveforms $B_1(t)$, $C_1(t)$, $B_1(t)$, $C_2(t)$, respectively, that are used to create the A(t) waveform of FIG. 24.

Referring first to FIG. 12, it can be seen that the A(t) waveform for zero or $n\pi$ rotation rate comprises a square wave having a period T (i.e., $1/f_m$) and thus has a fundamental frequency corresponding to the first harmonic frequency of the reference signal $f_m$. As is well known, a square wave, such as the square wave A(t) of FIG. 12, comprises only the odd harmonics of the fundamental frequency. Furthermore, as discussed above, when the rotation-induced phase shift $\phi_R$ is equal to zero or a multiple of $\pi$, the AC output signal $I_D{}^{AC}(t)$ from the AC amplifier 520 comprises only the even harmonics of the reference signal $f_m$ (e.g., $2f_m$, $4f_m$, etc.). Thus, in accordance with Equations 12 and 13 above, when the signal A(t) of FIG. 12 is multiplied by the AC output signal $I_D{}^{AC}(t)$ in the multiplier 522, the multiplier output signal M(t) will comprise only AC components and includes no DC components. Therefore, the output F(t) from the low-pass filter 524 will be zero. The waveform synthesizer 526 responds to the zero magnitude of the low-pass filter output F(t) by maintaining the synthesized waveform A(t) in its present form.

Referring now to FIGS. 13–16, it can be seen that the synthesized waveform A(t) comprises a combination of four waveforms. The first waveform $B_1(t)$ in FIG. 12 is a squarewave having a period of T/2. That is, the waveform $B_1(t)$ has a fundamental frequency of $2f_m$. The waveform $B_1(t)$ varies in amplitude between $+\frac{1}{2}$ and $-\frac{1}{2}$. (All amplitudes are normalized to the same maximum value.)

Figure 14:
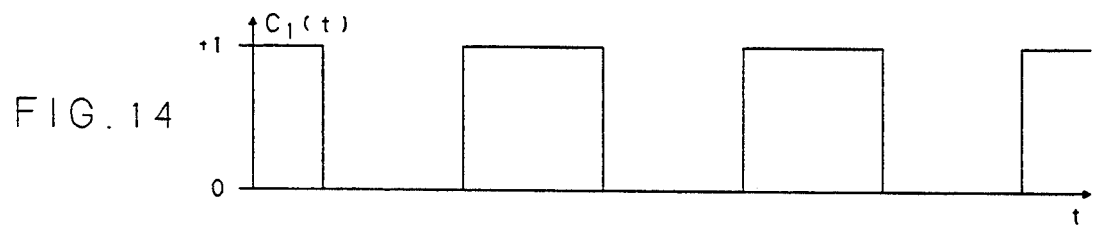

The second waveform $C_1(t)$ in FIG. 14 is a squarewave that has a period of T and thus has a frequency of $f_m$. The waveform $C_1(t)$ varies in amplitude between +1 and 0 (zero). The second waveform $C_1(t)$ has an initial phase relationship with the first waveform $B_1(t)$ such that each low-to-high or high-to-low transition of the second waveform $C_1(t)$ occurs at a high-to-low transition of the first waveform $B_1(t)$.

Figure 15:
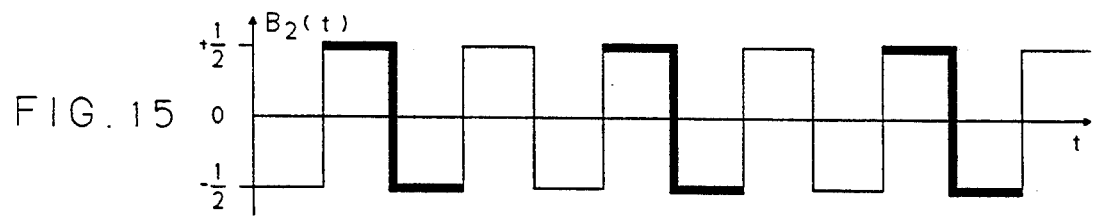

The third waveform $B_2(t)$ in FIG. 15 also has a fundamental frequency of $2f_m$ and an amplitude that varies between $+\frac{1}{2}$ and $-\frac{1}{2}$. It should be noted that the waveform $B_2(t)$ is the complement of the waveform $B_1(t)$. That is, the waveform $B_2(t)$ is shifted in phase by $\pi$ such that when the first waveform $B_1(t)$ has an amplitude of $+\frac{1}{2}$, the third waveform $B_2(t)$ has an amplitude of $-\frac{1}{2}$, and vice versa.

Figure 16:
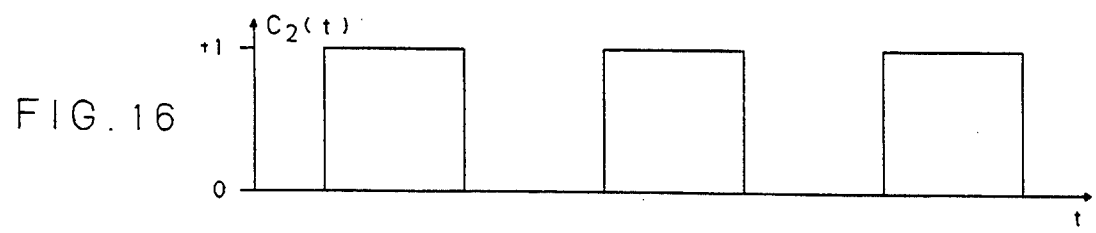

Finally, the fourth waveform $C_2(t)$ in FIG. 16 is a squarewave that has a period of T and an amplitude that varies between +1 and 0 like the waveform $C_1(t)$; however, the waveform $C_2(t)$ is the complement of the waveform $C_1(t)$ such that when the second waveform $C_1(t)$ has an amplitude of 1, the fourth waveform $C_2(t)$ has an amplitude of 0, and vice versa.

The synthesized waveform A(t) comprises the sum of the product of the first and second waveforms and the product of the third and fourth waveforms. That is:

$$A(t) = [B_1(t) \times C_1(t)] + [B_2(t) \times C_2(t)] \quad (14)$$

The multiplication can easily be envisioned by considering the $C_1(t)$ and $C_2(t)$ signals as logical gating signals for a multiplexer. When the $C_1(t)$ signal has an amplitude of 1, the A(t) signal comprises the corresponding amplitude of the $B_1(t)$ signal. The portions of the $B_1(t)$ signal comprising the A(t) signal are emphasized with thicker line portions in FIG. 13. Similarly, when the $C_2(t)$ signal has an amplitude of 1, the A(t) signal comprises the corresponding amplitude of the $B_2(t)$ signal. The portions of the $B_2(t)$ signal comprising the A(t) signal are emphasized with thicker line portions in FIG. 15.

Figure 18:
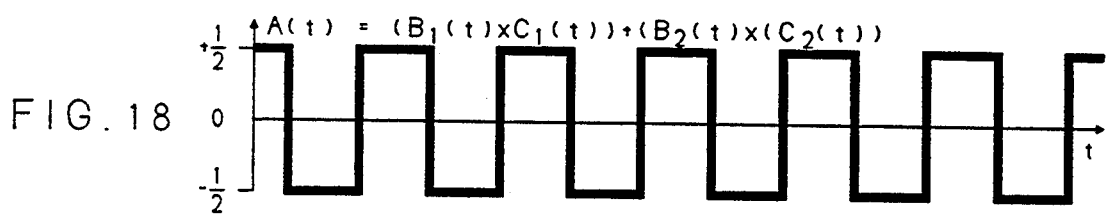
FIG. 18 illustrates an exemplary waveform for the output of the waveform synthesizer of FIG. 9 for a rotation rate that induces a Sagnac phase shift that is an odd multiple of $\pi/2$.

Referring now to FIG. 18, the signal A(t) is illustrated for a rotation rate that generates a phase-induced phase shift of $\pi/2$ or another odd multiple of $\pi/2$. As discussed above, a phase shift of $\pi/2$ causes the AC output signal $I_D{}^{AC}(t)$ to comprise odd harmonic components of the reference frequency $f_m$ (e.g., $f_m$, $3f_m$, $5f_m$, etc.). Thus, it is desirable that the synthesized waveform A(t) include only even harmonic components of the reference frequency so that the product of the synthesized waveform A(t) and the AC output signal $I_D{}^{AC}(t)$ includes only AC components and no DC components.

Figure 19:
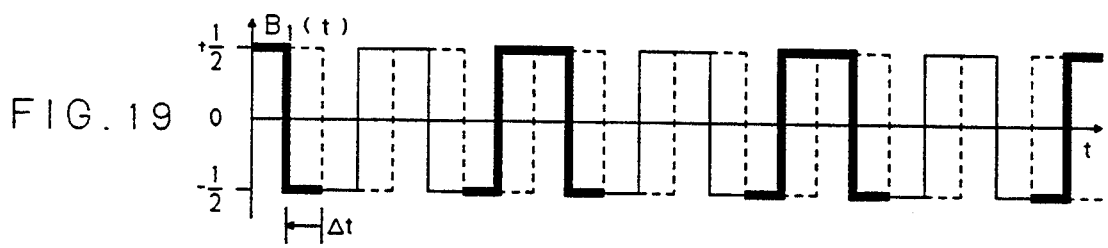
FIGS. 19, 20, 21 and 22 illustrate $B_1(t)$, $C_1(t)$, $B_2(t)$ and $C_2(t)$ waveforms, respectively, that can be advantageously used to construct the waveform of FIG. 18, showing the phase relationship between the $B_1(t)$ and $B_2(t)$ waveforms that causes the A(t) waveform of FIG. 18.
Figure 20:
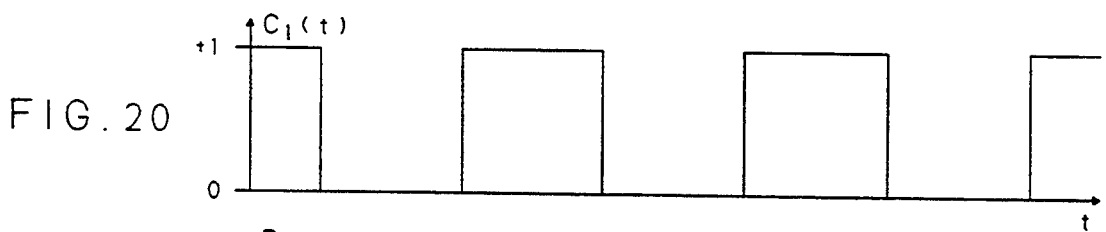
Figure 21:
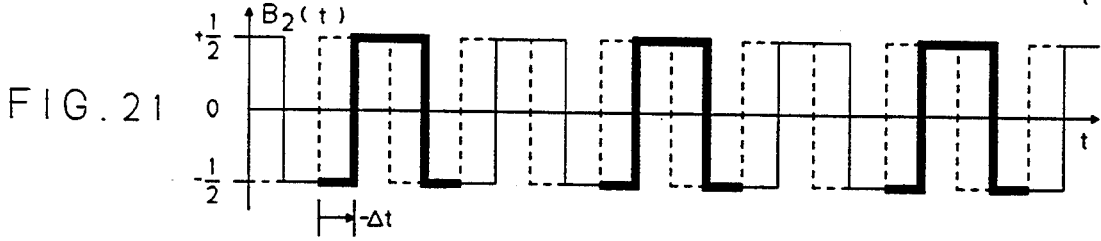
Figure 22:
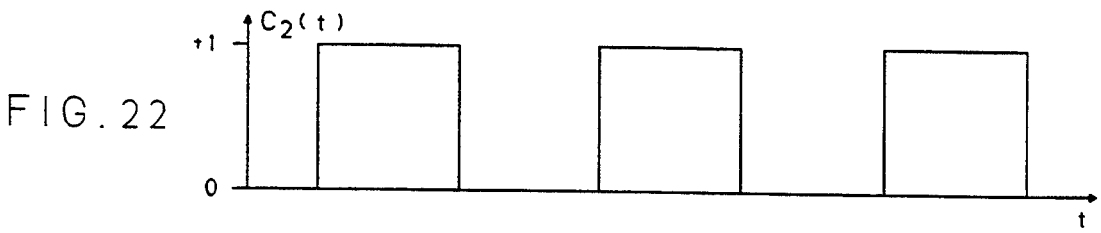
Figure 23:
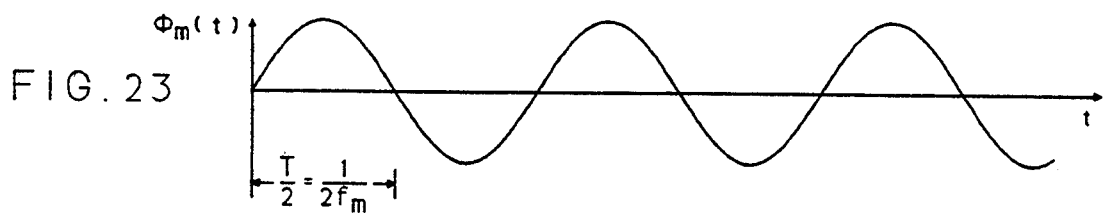
FIG. 23 illustrates an exemplary sinusoidal phase modulation signal at the frequency $f_m$.

FIGS. 19 and 21 represent the $B_1(t)$ waveform and the $B_2(t)$ waveform that are used to construct the A(t) waveform. It should be noted that FIGS. 20 and 22 represent the $C_1(t)$ and $C_2(t)$ waveforms, respectively, which are identical to the $C_1(t)$ and $C_2(t)$ waveforms of FIGS. 13 and 15, respectively. It can be seen that the $B_1(t)$ waveform has been shifted in phase by an amount $\Delta t$ (i.e., the transitions occur earlier in time) and the $B_2(t)$ waveform has been shifted in phase by an amount $-\Delta t$ (i.e., the transitions occur later in time). It can be seen that the two phase shifts $+\Delta t$ and $-\Delta t$ have the same magnitudes but are in opposite directions. In FIGS. 19 and 21, $+\Delta t$ and $-\Delta t$ are equal to $+\pi/2$ and $-\pi/2$, respectively (using the period T/2 of $B_1(t)$ and $B_2(t)$ as a reference for $2\pi$). It can be seen that when the $B_1(t)$ waveform is multiplexed by the $C_1(t)$ waveform and the $B_2(t)$ waveform is multiplexed by the $C_2(t)$ waveform, as indicated by the emphasized portions of the $B_1(t)$ and $B_2(t)$ waveforms, the resulting A(t) waveform in FIG. 16 has period of T/2 and thus has a fundamental frequency of $2f_m$. In other words, the synthesized waveform comprises even harmonics of the reference frequency $f_m$. Thus, when the synthesized waveform A(t) of FIG. 16 is multiplied by the AC output signal $I_D{}^{AC}(t)$ which comprises only odd harmonics, the resultant product M(t) will have no DC components. Thus, the low-pass filter output signal F provided as an input to the waveform synthesizer will be zero causing the waveform synthesizer to maintain the current synthesized waveform as its output.

Figure 24:
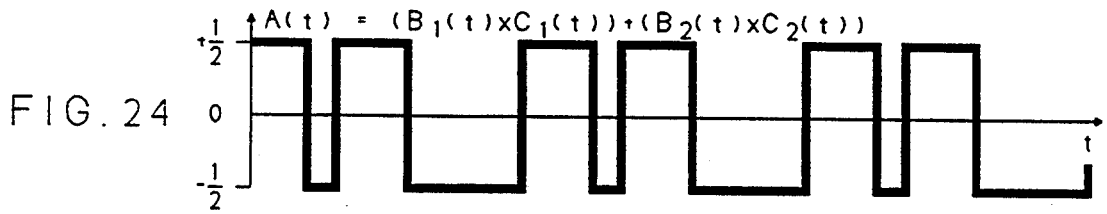
FIG. 24 illustrates an exemplary waveform for the output of the waveform synthesizer of FIG. 9 for a rotation rate that induces a Sagnac phase shift that is neither a multiple of $\pi$ nor an odd multiple of $\pi/2$.
Figure 25:
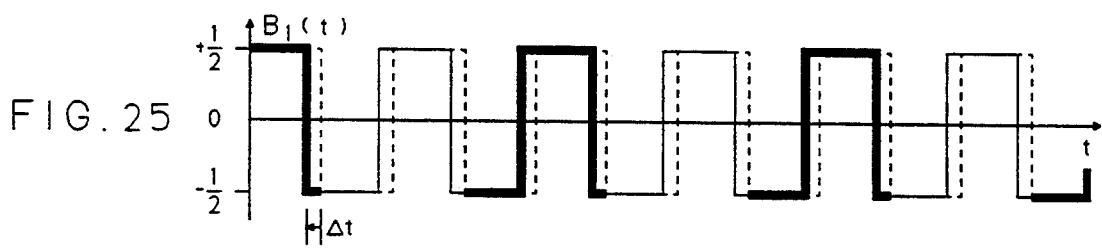
FIGS. 25, 26, 27 and 28 illustrate $B_1(t)$, $C_1(t)$, $B_2(t)$ and $C_2(t)$ waveforms, respectively, that can be advantageously used to construct the waveform of FIG. 24, showing the phase relationship between the $B_1(t)$ and $B_2(t)$ waveforms that causes the A(t) waveform of FIG. 24.
Figure 26:
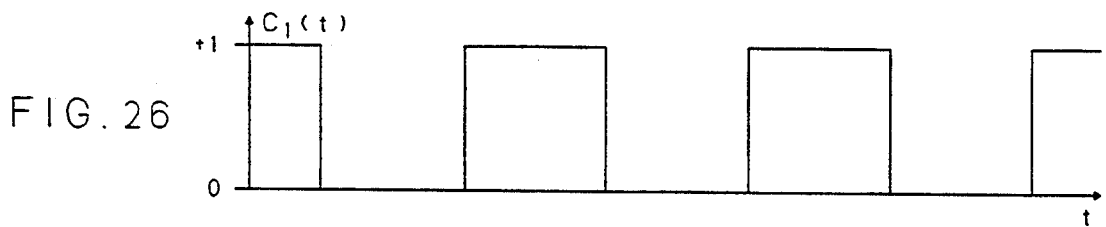
Figure 27:
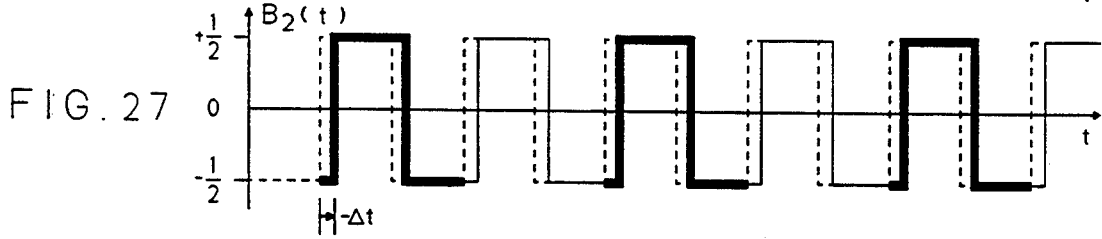
Figure 28:
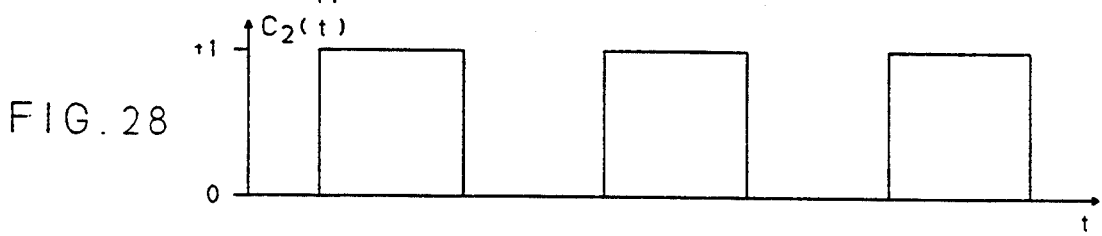

FIGS. 24–28 illustrate the waveforms A(t), $B_1(t)$, $C_1(t)$, $B_2(t)$ and $C_2(t)$, respectively, when the rotation induced phase shift has a magnitude between 0 and $\pi/2$, for example. The signals in FIGS. 24–28 are referenced to the phase modulation signal $\phi_m(t)$ signal in FIG. 23. Again, the $C_1(t)$ and $C_2(t)$ waveforms in FIGS. 26 and 28 are identical to the previous $C_1(t)$ and $C_1(t)$ waveforms in FIGS. 14 and 16, respectively. The $B_1(t)$ waveform in FIG. 25 is shifted by an amount $\Delta t$ which, in the example shown, has a magnitude that is greater than 0 and less than $\pi/2$ (again, wherein the period T/2 is equal to $2\pi$). In contrast, the $B_2(t)$ waveform in FIG. 27 is shifted by an amount $-\Delta t$ which has the same magnitude but the opposite direction. The resulting A(t) waveform shown in FIG. 24 comprises both odd and even harmonic components of the reference frequency $f_m$.

Figure 13:
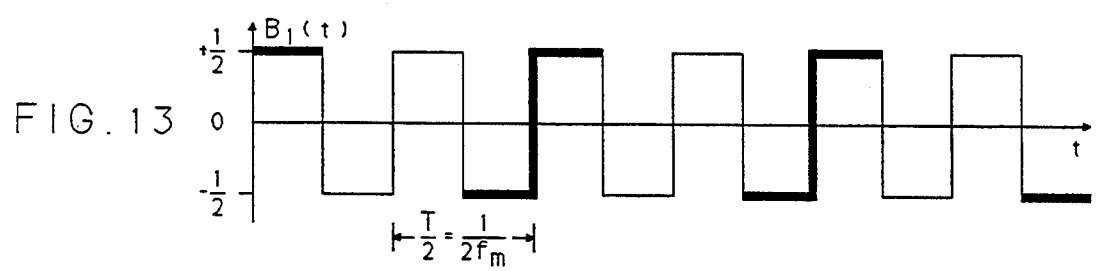
FIGS. 13, 14, 15 and 16 illustrate $B_1(t)$, $C_1(t)$, $B_2(t)$ and $C_2(t)$ waveforms, respectively, that can be advantageously used to construct the waveform of FIG. 12.

It can be seen that the $B_1(t)$ and $B_2(t)$ waveforms in each of the examples are always mirror images of each other with respect to the transitions in the $C_1(t)$ and $C_2(t)$ waveforms, which serve as reference waveforms as well as gating waveforms. That is, selecting any transition in either the $C_1(t)$ waveform or the $C_2(t)$ waveform, the appearance of the $B_1(t)$ waveform going one direction along the time axis t from the selected transition is identical to the $B_2(t)$ waveform going in the opposite direction along the time axis t from the selected transition. This necessarily follows since the original unshifted waveforms are mirror images with respect to the transitions, as shown in FIGS. 13 and 15, and the phase shifts are identical in magnitude and opposite in time. It can also be seen that the resulting A(t) waveform is symmetrical with respect to each of the transitions in the $C_1(t)$ and $C_2(t)$ waveforms since it comprises selected mirror image portions from the $B_1(t)$ and $B_2(t)$ waveforms.

As will be illustrated hereinafter, the synthesized waveform A(t) generated in the manner described above is used to accomplish the desired function of measuring the rotation rate. As set forth above, the first waveform $B_1(t)$ is a square wave having a period of T/2 and a fundamental frequency of $2f_m$. Thus, the first waveform $B_1(t)$ of FIGS. 13, 19 and 25 can be represented as a Fourier series:

$$B_1(t) = \frac{2}{\pi} \sum_{n=1}^{\infty} \frac{1}{2n-1} \sin(2(2n-1)\omega_m(t + \Delta t)) \quad (15)$$

(Note that the $2\omega_m$ factor in Equation 15 is a result of the $B_1(t)$ waveform having a fundamental frequency that is twice the fundamental frequency of the reference frequency $f_m$.)

Similarly, the third waveform $B_2(t)$ of FIGS. 15, 21 and 27 can be represented as a Fourier series:

$$B_2(t) = \frac{-2}{\pi} \sum_{n=1}^{\infty} \frac{1}{2n-1} \sin(2(2n-1)\omega_m(t - \Delta t)) \quad (16)$$

The second waveform $C_1(t)$ of FIGS. 14, 20 and 26 can be represented as a Fourier series:

$$C_1(t) = \frac{1}{2} + \frac{2}{\pi} \sum_{k=1}^{\infty} \frac{(-1)^{k+1}}{2k-1} \cos((2k-1)\omega_m t) \quad (17)$$

Finally, the fourth waveform $C_2(t)$ of FIGS. 16, 22 and 28 can be represented as a Fourier series:

$$C_2(t) = \frac{1}{2} - \frac{2}{\pi} \sum_{k=1}^{\infty} \frac{(-1)^{k+1}}{2k-1} \cos((2k-1)\omega_m t) \quad (18)$$

From Equations 14, 15, 16, 17 and 18, A(t) can be expressed as:

$$A(t) = (B_1(t) \times C_1(t)) + (B_2(t) \times C_2(t)) = \quad (19)$$

$$\frac{1}{\pi}\left\{ \sum_{n=1}^{\infty} \frac{1}{(2n-1)} [\sin(2(2n-1)\omega_m(t + \Delta t)) - \sin(2(2n-1)\omega_m(t - \Delta t))] \right\} +$$

$$\frac{4}{\pi^2}\left\{ \sum_{k=1}^{\infty} \left[ \frac{(-1)^{k+1}}{(2k-1)} \cos(2k-1)\omega_m t \right] \right\} \times$$

$$\sum_{n=1}^{\infty} \frac{1}{(2n-1)} [\sin[2(2n-1)\omega_m(t + \Delta t)] + \sin[2(2n-1)\omega_m(t - \Delta t)]] \right\}$$

The first term in Equation 19 includes a difference of two sine functions of the form:

$$\sin\alpha - \sin\beta = 2\cos[\tfrac{1}{2}(\alpha+\beta)] \times \sin[\tfrac{1}{2}(\alpha-\beta)] \quad (20)$$

and the second term in Equation 19 includes a sum of two sine functions of the form:

$$\sin\alpha + \sin\beta = 2\sin[\tfrac{1}{2}(\alpha+\beta)] \times \cos[\tfrac{1}{2}(\alpha-\beta)] \quad (21)$$

Thus, Equation 19 can be simplified to:

$$A(t) = \quad (22)$$

$$\frac{1}{\pi}\left\{ \sum_{n=1}^{\infty} \frac{1}{(2n-1)} 2\cos(2(2n-1)\omega_m t)\sin(2(2n-1)\omega_m \Delta t) \right\} +$$

$$\frac{4}{\pi^2}\left\{ \sum_{k=1}^{\infty} \left[ \frac{(-1)^{k+1}}{(2k-1)} \cos(2k-1)\omega_m t \right] \times \right.$$

$$\left. \sum_{n=1}^{\infty} \frac{1}{(2n-1)} [2\sin[2(2n-1)\omega_m t]\cos[2(2n-1)\omega_m \Delta t]] \right\}$$

The last term in Equation 22 is of the form:

$$\sin\alpha\cos\beta = \tfrac{1}{2}\sin(\alpha-\beta) + \tfrac{1}{2}\sin(\alpha+\beta) \quad (23)$$

Thus, Equation 22 can be simplified to:

$$A(t) = \quad (24)$$

$$\frac{2}{\pi} \sum_{n=1}^{\infty} \left[ \frac{1}{(2n-1)} \sin(2(2n-1)\omega_m \Delta t)\cos(2(2n-1)\omega_m t) \right] +$$

$$\frac{4}{\pi^2} \sum_{k=1}^{\infty} \sum_{n=1}^{\infty} \left\{ \left[ \frac{(-1)^{k+1}}{(2k-1)(2n-1)} \cos(2(2n-1)\omega_m \Delta t) \right] \times \right.$$

$$\left. [\sin[(2k + 4n - 3)\omega_m t] + \sin[(4n - 2k - 1))\omega_m t]] \right\}$$

Equation 24 can be evaluated to determine which harmonic components are present in the synthesized waveform A(t). For example, the fundamental or first harmonic components will be present when there are sine or cosine terms of the form $\sin\omega_m t$ or $\cos\omega_m t$. Similarly, the second harmonic components will be present when there are sine or cosine terms of the form $\sin 2\omega_m t$ or $\cos 2\omega_m t$. It can be seen that the first term of Equation 24, $\cos\{2(2n-1)\omega_m t\}$, cannot have odd harmonic components for any value of n. Thus, only the second set of terms need to be evaluated for the odd harmonics. The second term of Equation 24 will provide a first harmonic value when either (2k+4n−3) or (4n−2k−1) is equal to ±1. The term (2k+4n−3) cannot be equal to ±1 for any positive, non-zero combinations of k and n. Thus, only the second term (4n−2k−1) needs to be evaluated. The second term is equal to +1 when 2k−1 is equal to 4n−3, and is equal to −1 when 2k−1 is equal to 4n−1. By further evaluation, k is equal to 2n−1 in the first case and 2n in the second case. Substituting these values into Equation 24 and combining terms, the first harmonic component $A_1(t)$ of A(t) can be expressed as follows:

$$A_1(t) = \quad (25)$$

$$\frac{4}{\pi^2} \sum_{n=1}^{\infty} \left[ \frac{(-1)^{(2n-1)+1}}{(4n-3)(2n-1)} \cos(2(2n-1)\omega_m \Delta t)\sin\omega_m t + \right.$$

$$\left. \frac{(-1)^{2n+1}}{(4n-1)(2n-1)} \cos(2(2n-1)\omega_m \Delta t)\sin(-\omega_m t) \right] =$$

$$\frac{4}{\pi^2} \sum_{n=1}^{\infty} \left[ \frac{1}{(4n-3)(2n-1)} \cos(2(2n-1)\omega_m \Delta t)\sin\omega_m t + \right.$$

-continued $$\frac{(-1)}{(4n-1)(2n-1)} \cos(2(2n-1)\omega_m \Delta t)(-1)\sin\omega_m t \Bigg] =$$

$$\frac{4}{\pi^2} \sum_{n=1}^{\infty} \Bigg[ \Bigg( \frac{1}{(4n-3)(2n-1)} +$$

$$\frac{1}{(4n-1)(2n-1)} \Bigg) \cos(2(2n-1)\omega_m \Delta t)\sin\omega_m t \Bigg]$$

Thus:

$$A_1 = \frac{4}{\pi^2} \sum_{n=1}^{\infty} \Bigg[ \frac{4}{(4n-1)(4n-3)} \cos(2(2n-1)\omega_m \Delta t)\sin\omega_m t \Bigg]$$

With respect to the even harmonics, it can be readily seen that neither the $(2k+4n-3)$ nor the $(4n-2k-1)$ term in Equation 24 has a solution that provides an even number. Thus, the even harmonics only exist when the first set of terms provides an even value. The first set of terms only has values for $\cos 2\omega_m t$, $\cos 6\omega_m t$, $\cos 10\omega_m t$, $\cos 14\omega_m t$, etc. Thus, only the second, sixth, tenth and every other even harmonic exist as follows:

$$A_2(t) = \frac{2}{\pi} \sin(2\omega_m \Delta t)\cos(2\omega_m t) \tag{26}$$

$$A_3(t) = 0$$

$$A_6(t) = \frac{2}{\pi} \left( \frac{1}{3} \right) \sin(6\omega_m \Delta t)\cos(6\omega_m t)$$

$$A_8(t) = 0$$

$$A_{10}(t) = \frac{2}{\pi} \left( \frac{1}{5} \right) \sin(10\omega_m \Delta t)\cos(10\omega_m t)$$

With respect to the third harmonic term $3\omega_m t$, the only solution for the $(2k+4n-3)$ term of Equation 24 equal to $+3$ is $k=n=1$. The $(4n-2k-1)$ term is equal to $+3$ when $k$ is equal to $2(n-1)$ and is equal to $-3$ when $k$ is equal to $2n+1$. It should be noted that the $(4n-2k-1)$ term is only valid for $n$ greater than 1. Substituting these values into Equation 24, the third harmonic component $A_3(t)$ of $A(t)$ can be evaluated as:

$$A_3(t) = \frac{4}{\pi^2} \Bigg[ \frac{(-1)^{1+1}}{(2-1)(2-1)} \cos(2(2-1)\omega_m \Delta t)\sin(3\omega_m t) + \tag{27}$$

$$\sum_{n=2}^{\infty} \frac{(-1)^{2(n-1)+1}}{(4n-5)(2n-1)} \cos(2(2n-1)\omega_m \Delta t)\sin(3\omega_m t) +$$

$$\sum_{n=1}^{\infty} \frac{(-1)^{(2n+1)+1}}{(4n+1)(2n-1)} \cos(2(2n-1)\omega_m \Delta t)\sin(-3\omega_m t) \Bigg] =$$

$$\frac{4}{\pi^2} \Bigg[ \cos(2\omega_m \Delta t)\sin(3\omega_m t) +$$

$$\sum_{n=2}^{\infty} \frac{-1}{(4n-5)(2n-1)} \cos(2(2n-1)\omega_m \Delta t)\sin(3\omega_m t) +$$

$$\sum_{n=1}^{\infty} \frac{1}{(4n+1)(2n-1)} \cos(2(2n-1)\omega_m \Delta t)(-1)\sin(3\omega_m t) \Bigg] =$$

$$\frac{4}{\pi^2} \Bigg[ \cos(2\omega_m \Delta t) +$$

$$\sum_{n=2}^{\infty} \frac{-1}{(4n-5)(2n-1)} \cos(2(2n-1)\omega_m \Delta t) +$$

$$\sum_{n=1}^{\infty} \frac{1}{(4n+1)(2n-1)} \cos(2(2n-1)\omega_m \Delta t) \Bigg] \sin(3\omega_m t)$$

It can be seen that the first term in Equation 27 (cos $2\omega_m \Delta t$) can be combined with the second term so that Equation 27 can be further evaluated as follows:

$$A_3(t) = \frac{4}{\pi^2} \Bigg[ \sum_{n=1}^{\infty} \frac{-1}{(4n-5)(2n-1)} \cos(2(2n-1)\omega_m \Delta t) + \tag{28}$$

$$\sum_{n=1}^{\infty} \frac{-1}{(4n+1)(2n-1)} \cos(2(2n-1)\omega_m \Delta t) \Bigg] \sin(3\omega_m t) =$$

$$\frac{-4}{\pi^2} \Bigg[ \sum_{n=1}^{\infty} \frac{4}{(4n-5)(4n+1)} \cos(2(2n-1)\omega_m \Delta t) \Bigg] \sin(3\omega_m t)$$

The fifth harmonic components can be evaluated in a similar manner. The first term $(2k+4n-3)$ is equal to $+5$ only for $n=1$ and $k=2$. The second term $(4n-2k-1)$ is equal to $+5$ for $k=2n-3$, and is equal to $-5$ for $k=2n+2$. Substituting into Equation 25, the fifth harmonic component $A_5(t)$ of $A(t)$ can be evaluated as follows:

$$A_5(t) = \frac{4}{\pi^2} \Bigg[ \frac{(-1)}{3} \cos(2\omega_m \Delta t)\sin(5\omega_m t) + \tag{29}$$

$$\sum_{n=2}^{\infty} \frac{1}{(4n-7)(2n-1)} \cos(2(2n-1)\omega_m \Delta t)\sin(5\omega_m t) +$$

$$\sum_{n=1}^{\infty} \frac{-1}{(4n+3)(2n-1)} \cos(2(2n-1)\omega_m \Delta t)(-1)\sin(5\omega_m t) \Bigg] =$$

$$\frac{4}{\pi^2} \sum_{n=1}^{\infty} \frac{4}{(4n-7)(4n+3)} \cos(2(2n-1)\omega_m \Delta t)\sin(5\omega_m t)$$

As one final example, the seventh harmonic components can be evaluated by setting the first and second terms equal to $+7$. The first term $(2k+4n-3)$ has values of $n=1$, $k=3$ and $n=2$, $k=1$. The second term $(4n-2k-1)$ can be solved for $k=2(n-2)$ and $k=2n+3$. Substituting these values into Equation 25, the seventh harmonic components $A_7(t)$ of the synthesized waveform $A(t)$ can be evaluated as follows:

$$A_7(t) = \frac{4}{\pi^2} \Bigg[ \frac{1}{5} \cos(2\omega_m \Delta t)\sin(7\omega_m t) + \tag{30}$$

$$\frac{1}{3} \cos(6\omega_m \Delta t)\sin(7\omega_m t) +$$

$$\sum_{n=3}^{\infty} \frac{(-1)}{(4n-9)(2n-1)} \cos(2(2n-1)\omega_m \Delta t)\sin(7\omega_m t) +$$

$$\sum_{n=1}^{\infty} \frac{(+1)}{(4n+5)(2n-1)} \cos(2(2n-1)\omega_m \Delta t)\sin(7\omega_m t) \Bigg] =$$

$$\frac{4}{\pi^2} \Bigg[ \sum_{n=1}^{\infty} \frac{-4}{(4n-9)(4n+5)} \cos(2(2n-1)\omega_m \Delta t)\sin(7\omega_m t) \Bigg]$$

The foregoing can be readily summarized as follows. The even harmonics are the 2(2n−1)th harmonics for n=1, 2, 3, 4, . . . , and are of the form:

$$\frac{2}{\pi} \frac{1}{2n-1} \sin(2(2n-1)\omega_m \Delta t)\cos(2(2n-1)\omega_m t) \quad (31)$$

The odd harmonics are the (2l−1)th harmonics for l=1, 2, 3, 4, . . . , and are of the form:

$$\frac{16}{\pi^2} \sum_{n=1}^{\infty} \frac{(-1)^{l+1}}{(4n-2l-1)(4n+2l-3)} \cos(2(2n-1)\omega_m \Delta t)\sin((2l-1)\omega_m t) \quad (32)$$

Exemplary values for the first seven harmonics are as follows:

$$A_1(t) = \frac{16}{\pi^2} \Bigg[ \frac{1}{3}\cos(2\omega_m \Delta t) + \frac{1}{35}\cos(6\omega_m \Delta t) + \frac{1}{99}\cos(10\omega_m \Delta t) \ldots \Bigg] \sin(\omega_m t) \quad (33)$$

$$A_2(t) = \frac{2}{\pi} \sin(2\omega_m \Delta t)\cos(2\omega_m t)$$

$$A_3(t) = \frac{16}{\pi^2} \Bigg[ \frac{1}{5}\cos(2\omega_m \Delta t) - \frac{1}{27}\cos(6\omega_m \Delta t) - \frac{1}{91}\cos(10\omega_m t) \ldots \Bigg] \sin(3\omega_m t)$$

$$A_4(t) = 0$$

$$A_5(t) = \frac{16}{\pi^2} \Bigg[ \frac{-1}{21}\cos(2\omega_m \Delta t) + \frac{1}{11}\cos(6\omega_m \Delta t) + \frac{1}{75}\cos(10\omega_m \Delta t) \ldots \Bigg] \sin(5\omega_m t)$$

$$A_6(t) = \frac{2}{\pi} \Bigg[ \frac{1}{3}\sin(6\omega_m \Delta t) \Bigg] \cos(6\omega_m t)$$

$$A_7(t) = \frac{16}{\pi^2} \Bigg[ \frac{1}{45}\cos(2\omega_m \Delta t) + \frac{1}{13}\cos(6\omega_m \Delta t) - \frac{1}{51}\cos(10\omega_m \Delta t) \ldots \Bigg] \sin(7\omega_m t)$$

As set forth above, the synthesized waveform A(t) is multiplied by the AC output signal $I_D{}^{AC}(t)$. Since only the terms having the same frequency and phase combine to provide a DC component, the multiplication can be considered in two separate portions. The first portion comprises the multiplication of the even harmonics of the synthesized waveform A(t) by the corresponding even harmonics of the AC output signal $I_D{}^{AC}(t)$. The corresponding even harmonic portion of Equation 9 can be expressed as follows:

$$I_D^{AC}(t)_{even} = I_0 \sum_{n=1}^{\infty} J_{2(2n-1)}(\phi_m)\cos(2(2n-1)\omega_m t)\cos(\phi_R) \quad (34)$$

for n=1, 2, 3, 4, . . . .

Note that Equation 34 only includes the even harmonics $2\omega_m$, $6\omega_m$, $10\omega_m$, etc., since the other even harmonics do not occur in the synthesized waveform A(t). It can be shown that when A(t) is multiplied by $I_D{}^{AC}(t)$ to obtain the signal M(t), and M(t) is filtered by the low-pass filter 524, the resulting signal F has a set of DC components. One set of DC components results from the multiplication of A(t) by $I_D{}^{AC}(t)_{even}$. These components can be expressed as:

$$F_{even} = \frac{I_0}{\pi} \cos\phi_R \sum_{n=1}^{\infty} \frac{J_{2(2n-1)}(\phi_m)}{(2n-1)} \sin(2(2n-1)\omega_m \Delta t) \quad (35)$$

A second set of components in the signal F result from the multiplication of the odd harmonics of the AC output signal $I_D{}^{AC}(t)$ by the odd harmonics of the synthesized waveform A(t). Rewriting the odd harmonic portion of Equation 9 in a format compatible with the format of the odd harmonics of the synthesized waveform A(t), the odd harmonics of the AC output signal $I_D{}^{AC}(t)$ can be expressed as:

$$I_D^{AC}(t)_{odd} = -I_0 \sin\phi_R \sum_{n=1}^{\infty} J_{2n-1}(\phi_m)\sin((2n-1)\omega_m t) \quad (36)$$

When the odd harmonics of the AC output signal $I_D{}^{AC}(t)$ are multiplied by the corresponding odd harmonics of the synthesized waveform A(t) and filtered by the low-pass filter 524, the DC component resulting from the multiplication can be expressed as:

$$F_{odd} = -\frac{8I_0}{\pi^2} \sin\phi_R \sum_{n=1}^{\infty}\sum_{l=1}^{\infty} \frac{(-1)^{l+1} J_{2l-1}(\phi_m)}{(4n-2l-1)(4n+2l-3)} \cos(2(2n-1)\omega_m \Delta t) \quad (37)$$

Thus, the output signal F from the low-pass filter 524 can be represented as:

$$F = F_{even} + F_{odd} = \frac{I_0}{\pi} \cos\phi_R \sum_{n=1}^{\infty} \frac{J_{2(2n-1)}(\phi_m)}{(2n-1)} \sin(2(2n-1)\omega_m \Delta t) - \quad (37)$$

$$\frac{8I_0}{\pi^2} \sin\phi_R \sum_{n=1}^{\infty} \sum_{l=1}^{\infty} \frac{(-1)^{l+1} J_{2l-1}(\phi_m)}{(4n-2l-1)(4n+2l-3)} \cos(2(2n-1)\omega_m \Delta t)$$

As discussed above, the waveform synthesizer 526 operates to adjust the synthesized waveform A(t) until the low-pass filter output signal F is substantially equal to zero.

It can be seen that by setting F equal to zero, Equation 38 can be solved for the $\sin\phi_R$ and the $\cos\phi_R$ and thus for $\Phi_R$, as follows:

$$\frac{1}{\pi} \cos\phi_R \sum_{n=1}^{\infty} \frac{J_{2(2n-1)}(\phi_m)}{(2n-1)} \sin(2(2n-1)\omega_m \Delta t) - \tag{39}$$

$$\frac{8}{\pi^2} \sin\phi_R \sum_{n=1}^{\infty} \sum_{l=1}^{\infty} \frac{(-1)^{l+1} J_{2l-1}(\phi_m)}{(4n-2l-1)(4n+2l-3)} \cos(2(2n-1)\omega_m \Delta t)$$

$$\frac{\sin\phi_R}{\cos\phi_R} = \tan\phi_R = \left[ \frac{\pi}{8} \frac{\sum_{n=1}^{\infty} \frac{J_{2(2n-1)}(\phi_m)}{2n-1} \sin(2(2n-1)\omega_m \Delta t)}{\sum_{n=1}^{\infty} \sum_{l=1}^{\infty} \frac{(-1)^{l+1} J_{2l-1}(\phi_m)}{(4n-2l-1)(4n+2l-3)} \cos(2(2n-1)\omega_m \Delta t)} \right]$$

Thus, $$\phi_R = \tan^{-1}\left[ \frac{\pi}{8} \frac{\sum_{n=1}^{\infty} \frac{J_{2(2n-1)}(\phi_m)}{2n-1} \sin(2(2n-1)\omega_m \Delta t)}{\sum_{n=1}^{\infty} \sum_{l=1}^{\infty} \frac{(-1)^{l+1} J_{2l-1}(\phi_m)}{(4n-2l-1)(4n+2l-3)} \cos(2(2n-1)\omega_m \Delta t)} \right] \tag{40}$$

The waveform synthesizer 526 operates by varying the $\Delta t$ in the $B_1(t)$ and the $B_2(t)$ waveforms while monitoring the value of F and comparing F to zero. When F has a non-zero magnitude of a first polarity (e.g., a positive non-zero value), the value of $\Delta t$ is increased. On the other hand, when F has a non-zero magnitude of the opposite polarity (e.g., a negative non-zero value), the value of $\Delta t$ is decreased. The value of $\Delta t$ is continually adjusted by the waveform synthesizer 526 to maintain F at a value substantially equal to zero. The $\Delta t$ required to set F equal to zero is measured, and $\Phi_R$ is calculated using Equation 40. The calculated $\phi_R$ corresponds to $\Delta\Phi_R$. The calculated $\Delta\Phi_R$ is then substituted into Equation 1 above so that the rotation rate Q can be calculated.

It should be understood from the foregoing that although the differential phase shift is a periodic function such that the effect of a differential phase shift of $\pi$ on the detected light intensity is indistinguishable from the effect of a differential phase shift of $3\pi$, the method of the present invention can readily distinguish such phase shifts. Assuming that the waveform synthesizer 526 is enabled when the rotation rate is zero, as the rotation rate increases, the $\Delta t$ required to reduce F to zero will continually increase. The $\Delta t$ value does not reset to zero at each of the maxima and minima. Similarly, as the rotation rate in one direction (e.g., clockwise or counterclockwise) decreases, the $\Delta t$ value will decrease until it reaches zero when the rotation rate reaches zero, and will then increase with the opposite polarity if the rotation rate starts increasing in the opposite direction.

Figure 29:
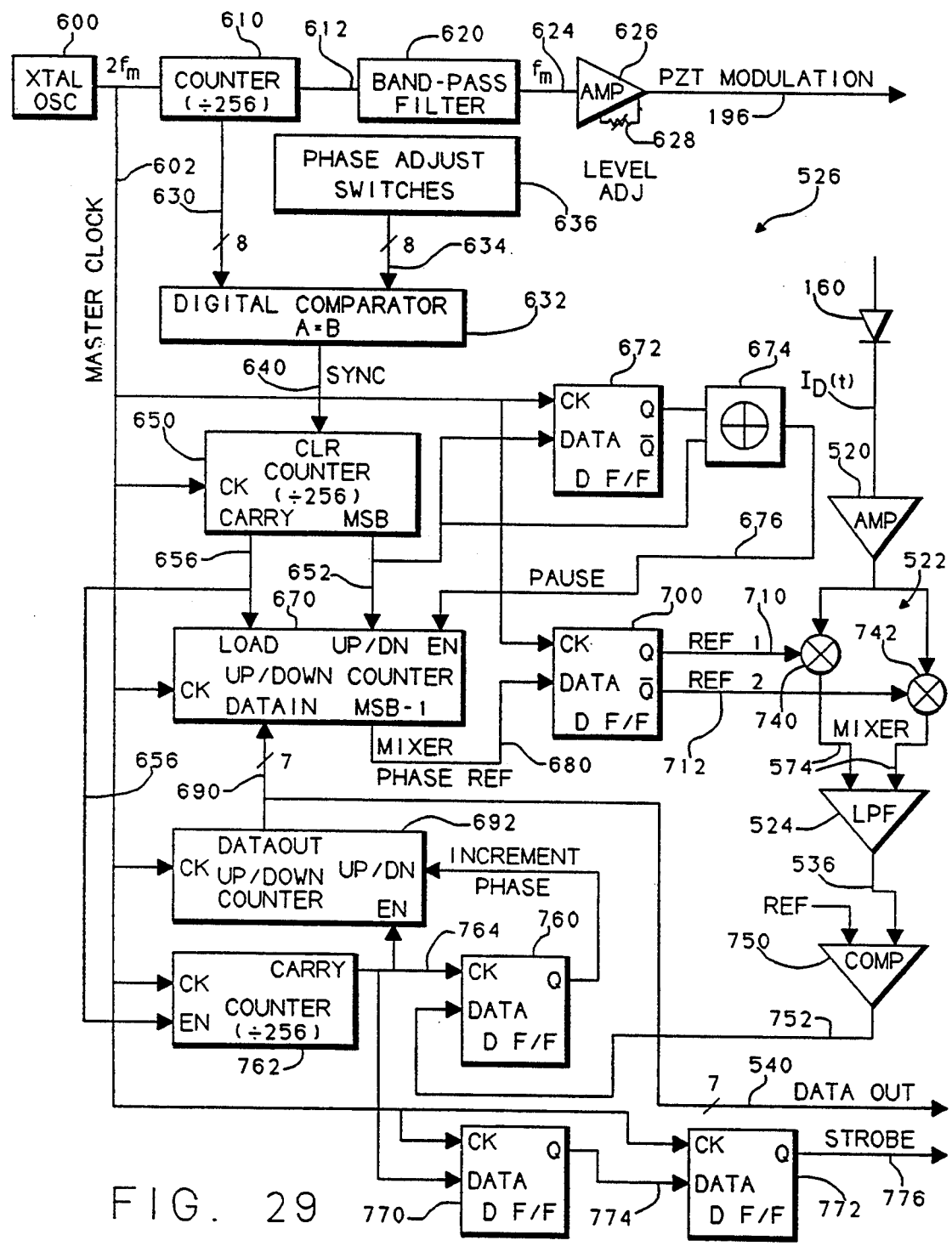
FIG. 29 illustrates one embodiment of a waveform synthesizer of FIG. 9 that generates the synthesized waveform A(t) of FIGS. 12, 18 and 24 in response to the magnitude and polarity of the low-pass filter output signal F, and that also generates an output signal indicative of the rotation rate.

FIG. 29 illustrates one embodiment of a waveform synthesizer 526 that generates the synthesized waveform A(t) in response to the magnitude and polarity of the low-pass filter output signal F. The operation of the waveform synthesizer can be understood by referring to the waveforms illustrated in FIGS. 30-32.

The waveform synthesizer 526 includes a crystal oscillator (XTAL OSC) 600 that generates a master clock signal (MASTER CLOCK) on a line 602. The clock signal is illustrated by a waveform 604 in FIGS. 30, 31 and 32, and has a frequency that is 256 times the reference frequency $f_m$. For example, in one particularly preferred embodiment, the master clock signal has a frequency of approximately 25 MHz, and the reference frequency $f_m$ has a frequency of approximately 97.7 kHz.

Figure 30:
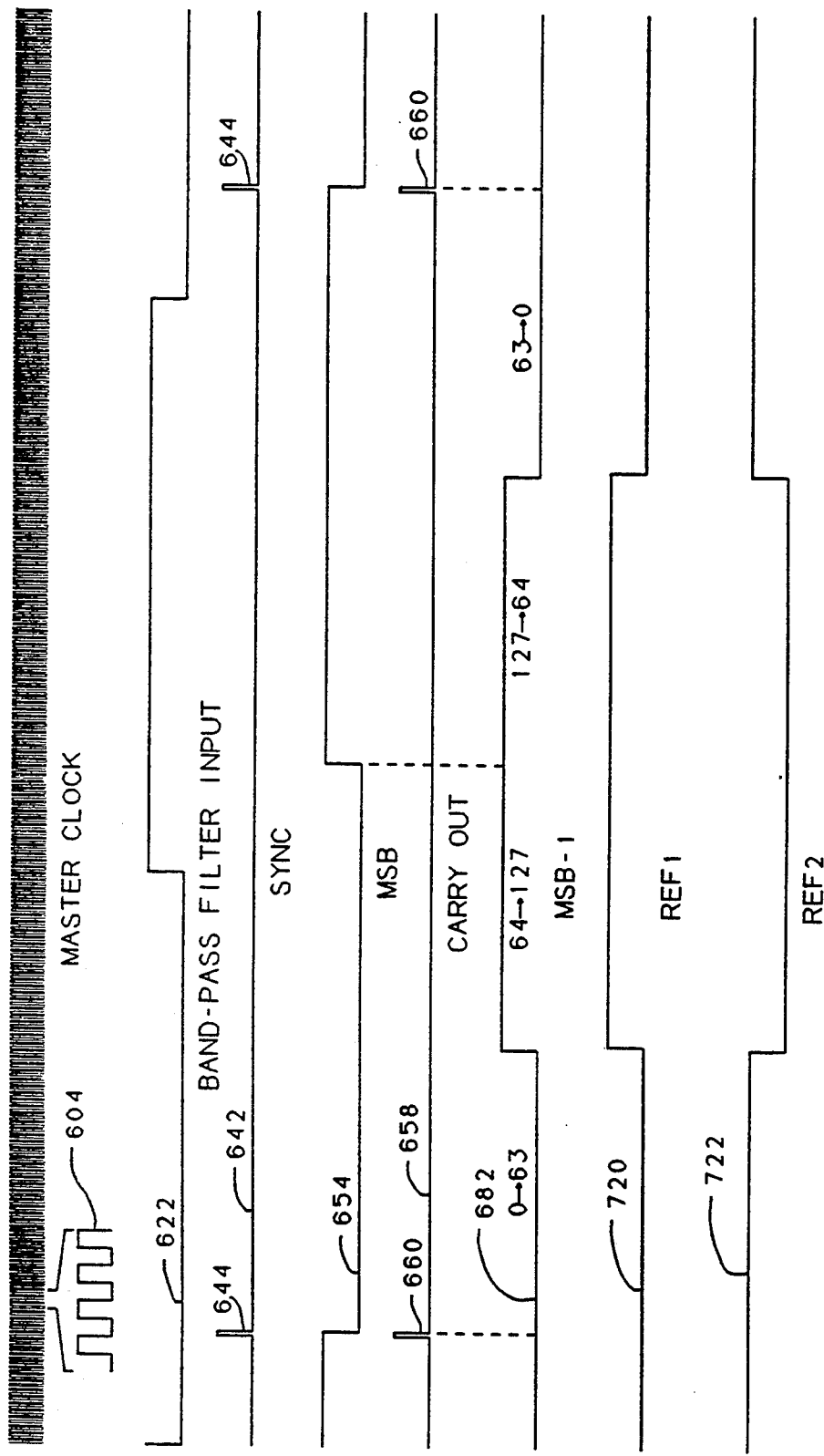
FIG. 30 illustrates waveforms generated by the waveform synthesizer of FIG. 29 to generate the synthesized waveform illustrated in FIG. 12.
Figure 31:
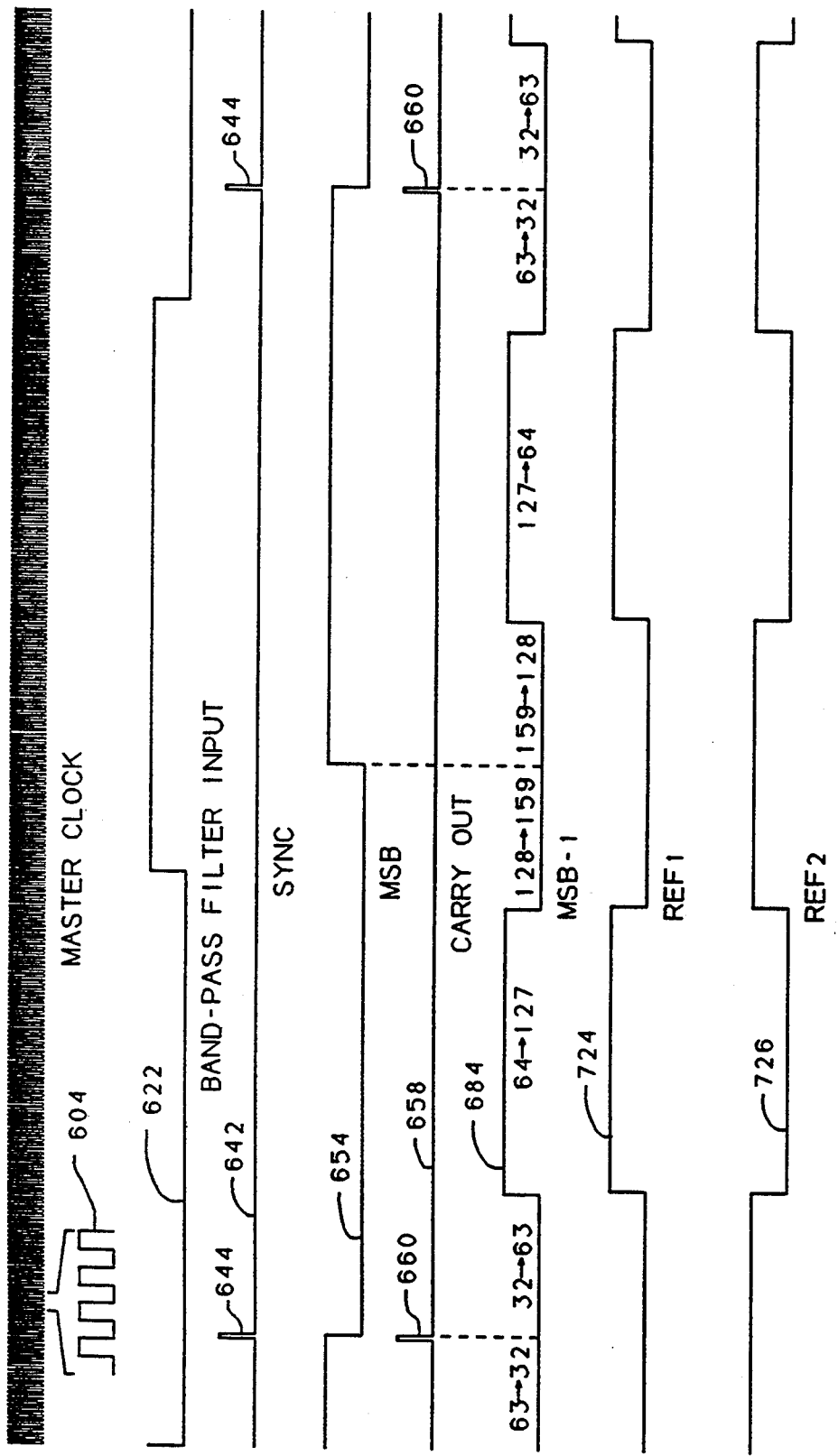
FIG. 31 illustrates waveforms generated by the waveform synthesizer of FIG. 29 to generate the synthesized waveform illustrated in FIG. 18.
Figure 32:
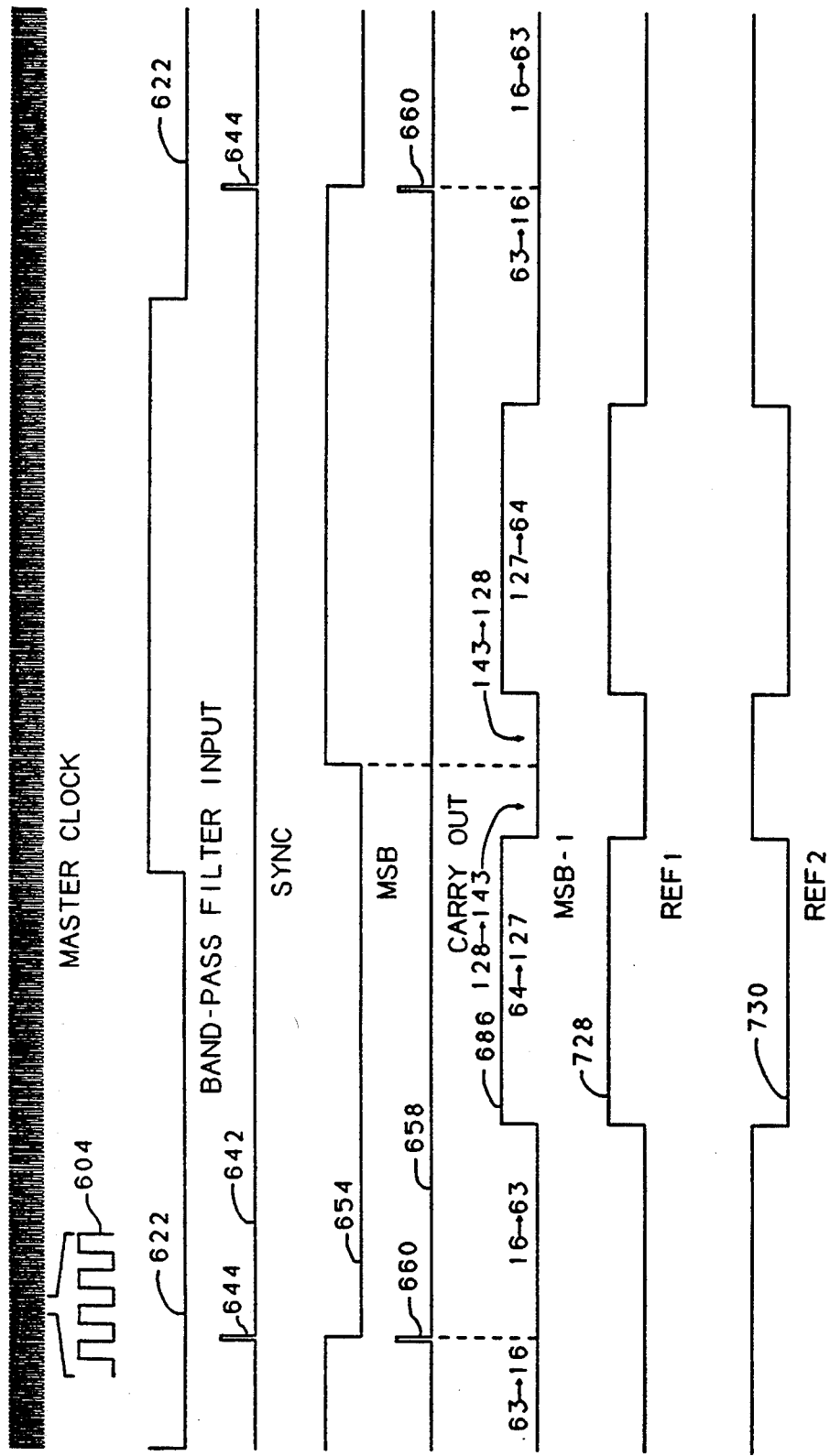
FIG. 32 illustrates waveforms generated by the waveform synthesizer of FIG. 29 to generate the synthesized waveform illustrated in FIG. 24.

The master clock signal is provided as an input to a first divide-by-256 counter 610 that provides a square-wave output signal on a line 612 that has a frequency equal to the reference frequency $f_m$. For example, the first counter 610 is advantageously an eight-bit binary counter and the square-wave output signal is connected to the most significant output bit of the first counter 610. The square-wave output signal is provided as an input to a band-pass filter 620 that has a center frequency of $f_m$ and is referred to hereinafter as the band-pass filter input signal, which is illustrated in FIGS. 30, 31 and 32 as a waveform 622 (BAND-PASS FILTER INPUT).

The output of the band-pass filter 620 is provided on a line 624 and is a generally sinusoidal signal having a frequency $f_m$. The sinusoidal signal is provided as an input to an amplifier (AMP) 626 that generates an amplified output signal (PZT MODULATION) on the line 196 that is connected to the phase modulator 192 (FIG. 9). The amplitude of the amplified output signal is adjusted to provide a desired phase modulation $\phi_m(t)$ via a variable resistor 628 that is coupled to the amplifier 626 in a conventional manner.

The first counter 610 has eight output bits. The eight output bits are connected via a bus 630 to one set of inputs of an eight-bit digital comparator 632. The digital comparator 632 has a second set of inputs that are connected via a bus 634 to a set of eight phase adjust switches 636. For example, the phase adjust switches 636 can be a conventional set of DIP (dual-in-line package) switches, thumbwheel switches, or the like. The output of the digital comparator 632 is a synchronization signal (SYNC) on a line 640 which is illustrated by a waveform 642 in FIGS. 30, 31 and 32. The synchronization signal 642 comprises a synchronization pulse 644 that occurs once for every 256 cycles of the clock signal on the line 602 when the eight output bits from the counter 610 match the respective settings of the phase adjust switches 636. The position of the synchronization pulse 644 is synchronized with the band-pass filter input signal on the line 612 from the first counter 610. The position of synchronization pulse 644 in time with respect to the phase of the band-pass filter input signal 622 can be varied by changing the settings of the phase adjust switches 636. Although the induced phase modulation $\phi_m(t)$ is responsive to and synchronized with the band-pass filter input signal 622, the induced phase modulation may not be in phase with the band-pass filter input signal 622. The purpose of the variable phase adjustment is to accommodate variations in the phase of the phase modulation generated by the phase modulator 192 (FIG. 9) so that the synthesized output signal A(t) generated by the waveform synthesizer has the proper phase relationship with the induced phase modulation $\phi_m(t)$. Once adjusted for a particular optical loop 114, the settings of the phase adjust switches 636 should remain substantially constant.

The synchronization signal is provided as the clear input to a second eight-bit binary counter (i.e., divide-by-256 counter) 650. The second counter 650 has a clock input that is connected to the master clock signal on the line 602. Each occurrence of the synchronization pulse 644 causes the second counter 650 to be cleared to a zero value on the next active transition of the master clock signal so that it starts counting from zero. The second counter 650 advantageously has eight output bits; however, only the most significant output bit (MSB) is utilized. The most significant output bit is provided on a signal line 652. As illustrated by a waveform 654 in FIGS. 30, 31 and 32, the frequency of the most significant output bit of the second counter 650 is the same as the frequency of the band-pass filter input signal 622 but is shifted in phase in accordance with the time position of the synchronization pulse 644. It can be seen that the most significant output bit signal waveform 654 is inactive low for the first 128 cycles of the master clock signal that occur following the synchronization pulse 644, and is active high for the second 128 cycles that occur following the synchronization pulse 644.

The second counter 650 also generates a carry out (CARRY OUT) signal on a line 656. As illustrated by a waveform 658 in FIGS. 30, 31 and 32, the carry out signal 658 provides an active high pulse 660 during the master clock cycle immediately before the most significant output bit signal 654 changes from its active high state to its inactive low state, and thus coincides with the synchronization pulse 644.

The most significant output bit of the second counter 650 is provided as an input to the up/down control of a first eight-bit binary up/down counter 670. The first up/down counter 670 is responsive to the signal level on the up/down control. That is, when the signal level is low, for example, the first up/down counter 670 counts up, and when the signal level is high, the first up/down counter 670 counts down. The most significant output bit from the second counter 650 is also provided as the D-input of a D-type flip-flop 672 and to one input of an exclusive-OR gate 674. The flip-flop 672 is clocked by the master clock signal on the line 602. The Q-output of the flip-flop 672 is connected to the second input of the exclusive-OR gate 674. The output of the exclusive-OR gate 674 is provided as an active low enable input to the first up/down counter 670 via an enable line 676 (labeled as "PAUSE" in FIG. 29). The flip-flop 672 and the exclusive-OR gate 674 generate a high logic level on the enable line 676 for one clock cycle each time the most significant output bit of the second counter 650 switches from the low logic level to the high logic level and vice versa. Thus, the flip-flop 672 and the exclusive-OR gate 674 operate as an inhibit circuit that inhibits the counting of the first up/down counter 670 for one clock cycle following each transition in the signal level of the most significant output bit of the second counter 650. Thus, since the up/down control is connected to the most significant output bit from the second counter 650, the first up/down counter 670 counts up 127 times starting one clock cycle after the synchronization signal pulse 644, pauses for one clock cycle following the change in the most significant output bit from the second counter 650, and then counts down 127 times back to its initial starting value. It can thus be seen that the first up/down counter 670 counts symmetrically about the transition of the most significant output bit of the first counter 650.

The first up/down counter 670 has a plurality of data outputs; however, in the illustrated embodiment, only the next-most-significant bit (MSB−1) is provided as an output signal on a signal line 680. That is, assuming that the least significant bit is designated as bit 0 and the most significant bit is bit 7, then bit 6 is connected to the line 680. Thus, when the first up/down counter 670 has a count of 0–63 or 128–191, the MSB−1 signal has a low signal level; and when the first up/down counter 670 has a count of 64–127 or 192–255, the MSB−1 signal has a high signal level. Since the first up/down counter 670 is counting symmetrically about the transition in the most significant output bit of the first counter 650, the MSB−1 signal also is substantially symmetrical (within one-half clock cycle) about the transition in the most significant output bit as illustrated by MSB−1 signal waveforms 682, 684 and 686 in FIGS. 30, 31 and 32, respectively.

The carry out signal 658 of the second counter 650 on the line 656 is provided as an input to the load control of the first up/down counter 670. The first up/down counter 670 has a set of data inputs connected to a data bus 690. When the carry out signal of the second counter 650 is active, the data on the data bus 690 is loaded into the first up/down counter 670 to provide the initial count value from which the counter counts. In the embodiment described herein, the data bus 690 comprises seven bits. The most significant input bit to the first up/down counter 670 is connected to a low signal (e.g., logic ground). The seven bits from the data bus 690 are loaded into the seven least significant bits of the counter 670.

The data bus 690 is connected to the data outputs of a second eight-bit binary up/down counter 692. As will be discussed below, the second up/down counter 692 provides data outputs on the data bus 690 that are responsive to the Sagnac induced phase difference $\Delta\Phi_R$. Thus, the data on the bus 690 provide a digital representation of the Sagnac induced phase difference $\Delta\Phi_R$. These data are provided as the outputs of waveform synthesizer 526 on the data bus 540 which is connected to the data bus 690.

As set forth above, each time the carry out signal from the second counter 650 is active, the data on the data bus 690 are loaded into the first up/down counter 670 to provide an initial count value. The first up/down counter 670 then counts up 127 times from that initial value and then counts back down 127 times to the initial value. For example, as illustrated by the waveform 682 in FIG. 30, the first up/down counter 670 counts from an initial value of 0 up to a value of 127, pauses, and then counts back down to 0.

The signal levels on the MSB−1 output line 680 depend upon the initial value loaded into the first up/down counter 670. Thus, as illustrated by the waveform 684 in FIG. 31, when the initial value is equal to 32, the first up/down counter 670 initially counts up from 32 to 63, at which time the signal level on the MSB−1 output line 680 switches from low to high. The first up/down counter 670 continues to count up from a value of 64 to a value of 127, at which time the MSB−1 signal level switches from high back to low. The first up/down counter 670 continues to count up from a value of 128 to a value of 159, at which time it pauses one clock cycle when the most significant output bit from the second counter 650 changes signal levels. Thereafter, the first up/down counter 670 begins counting down from 159 to 128, at which time the MSB−1 signal level switches from low to high; then from 127 down to 64, at which time the MSB−1 signal switches from high to low; and then from 63 down to 32, at which time the first up/down counter 670 is again reloaded with the initial value.

In like manner, when the first up/down counter 670 is loaded with an initial count of 16, as illustrated by the MSB−1 waveform 686 in FIG. 32, the MSB−1 waveform starts with a low signal level. The first up/down counter 670 counts to 63, at which time the MSB−1 signal level switches high; continues counting to 127, at which time the MSB−1 signal level switches low; continues counting to a value of 143, where the counting pauses for one clock cycle; and then counts down to 128, at which time the MSB−1 signal level switches high; continues counting from 127 down to 64, at which time the MSB−1 signal level switches low; and then counts down from 63 to 16, at which time the initial count is again loaded.

It can be seen that the waveforms 682, 684 and 686 of FIGS. 30, 31 and 32, respectively, are similar to the A(t) waveforms of FIGS. 12, 18 and 24, respectively. In particular, the waveform 682 of FIG. 30 has a frequency of $f_m$ and thus corresponds to the waveform A(t) that is generated when the Sagnac induced phase difference is zero or a multiple of $\pi$. The waveform 684 of FIG. 31 has a frequency of $2f_m$, and thus corresponds to the waveform A(t) that is generated when the Sagnac induced phase difference is an odd multiple of $\pi/2$. The waveform 686 of FIG. 32 corresponds to the waveform A(t) that is generated when the Sagnac induced phase difference is neither a multiple of $\pi$ nor an odd multiple of $\pi/2$. It can be seen for each waveform 682, 684 and 686 that the portion of the waveform generated when the first up/down counter 670 is counting up corresponds to the waveforms in FIGS. 13, 19 and 25, respectively, when the respective $C_1(t)$ signals are active, and that the portion of the waveform generated when the first up/down counter 670 is counting down corresponds to the waveforms in FIGS. 15, 21 and 27, respectively, when the respective $C_2(t)$ signals are active. The first up/down counter 670 thus provides an exemplary system for generating the mirrored waveforms described above.

The MSB−1 signal output on the line 680 from the first up/down counter 670 is referred to as the mixer phase reference (MIXER PHASE REF) and is provided as the data input to a D-type flip-flop 700 which is clocked by the master clock on the line 602. The flip-flop 700 has a Q-output and a $\overline{Q}$-output which are delayed by one clock cycle from the mixer phase reference signal on the line 680. The Q-output and $\overline{Q}$-output provide oppositely phased signals REF 1 and REF 2 on signal lines 710 and 712, respectively, as illustrated by waveforms 720 and 722 in FIG. 30, waveforms 724 and 726 in FIG. 31, and waveforms 728 and 730 in FIG. 32.

The REF 1 and REF 2 signals are provided as inputs to the mixer circuit 522. In the embodiment described herein, the mixer circuit 522 comprises a first mixer 740 and a second mixer 742. The first mixer 740 has a first input that is connected to receive the REF 1 signal on the line 710. The second mixer 742 has a first input that is connected to receive the REF 2 signal on the line 712. The first mixer 740 and the second mixer 742 have respective second inputs that are connected together and connected to output of the AC amplifier 520, which has its input connected to the output of the photodetector 160, as described above in connection with FIG. 9.

Since the two mixers 740 and 742 are connected to oppositely phased mixer reference signals, and have a common input signal, the outputs of the two mixers 740 comprise a differential signal pair that corresponds to the multiplication of the input signal from the AC amplifier 520 by the mixer phase reference signal from the first up/down counter 670. The differential signals are provided as inputs to the low-pass filter 524 via a pair of signal lines 574 corresponding to the signal line 574 in FIG. 9. In the embodiment described in FIG. 29, the low-pass filter 524 is advantageously a differential low-pass filter of conventional construction.

The output of the low-pass filter 524 has a DC content that results from the multiplication of the input signal by the mixer phase reference signal, as discussed above. The output of the low-pass filter 524 is provided as an input to a comparator 750 via the signal line 536. The comparator 750 compares the magnitude of the low-pass filter output to a reference magnitude (e.g., zero volts) and provides an output signal having a first value when the low-pass filter output is greater than the reference magnitude and having a second value when the low-pass filter output is less than the reference magnitude. Thus, the output of the comparator 750 on a line 752 indicates whether the $\Delta t$ value of the synthesized waveform (i.e., the mixer phase reference signal) should be increased or decreased, as discussed above in connection with Equation 38 and FIGS. 11–28.

The output of the comparator 750 is provided as the data input to a D-type flip-flop 760 that is clocked by the carry output of a third eight-bit binary counter 762 via a signal line 764. The third counter 762 has its clock input connected to the master clock on the signal line 602. The third counter 762 has an enable input that is connected to the carry output of the second counter 650 via the carry signal line 656. The third counter 762 provides a carry output signal on the signal line 764 that pulses once for every 256 pulses on the carry signal line 656 and thus clocks the flip-flop 760 approximately 381 times per second. At the same time, the carry output signal on the line 764 is provided as an enable input signal to the second up/down counter 692. Thus, the second up/down counter 692 is enabled to count up or down approximately 381 times per second. Whether the second up/down counter 692 counts up or down depends upon the Q-output of the flip-flop 760, which in turn depends upon the output of the comparator 750 on the signal line 752. Thus, the second up/down counter 692 will be continually updated with a new value depending upon whether the $\Delta t$ needs to be increased by increasing the count or decreased by decreasing the count.

The carry output signal on the signal line 764 is also provided as a data input to a D-type flip-flop 770. The clock input of the flip-flop 770 is connected to the master clock signal on the signal line 602. The Q-output of the flip-flop 770 is provided as the data input to a flip-flop 772 via a signal line 774. The flip-flop 772 is also clocked by the master clock signal. The Q-output of the second flip-flop 772 is provided as a strobe output signal on a signal line 776. The flip-flop 770 and the flip-flop 772 operate together to delay the carry output signal from the third counter 762 by two clock cycles so that the strobe output signal on the signal line 776 is active a sufficient time after the data changes on the data output bus 540 so that any required data setup time for a display device, or the like, is satisfied. The digital value on the data out bus 540 represents $\Delta t$. The $\Delta t$ value can be used with Equation 40 to calculate $\phi_R$, as discussed above.

Figure 33:
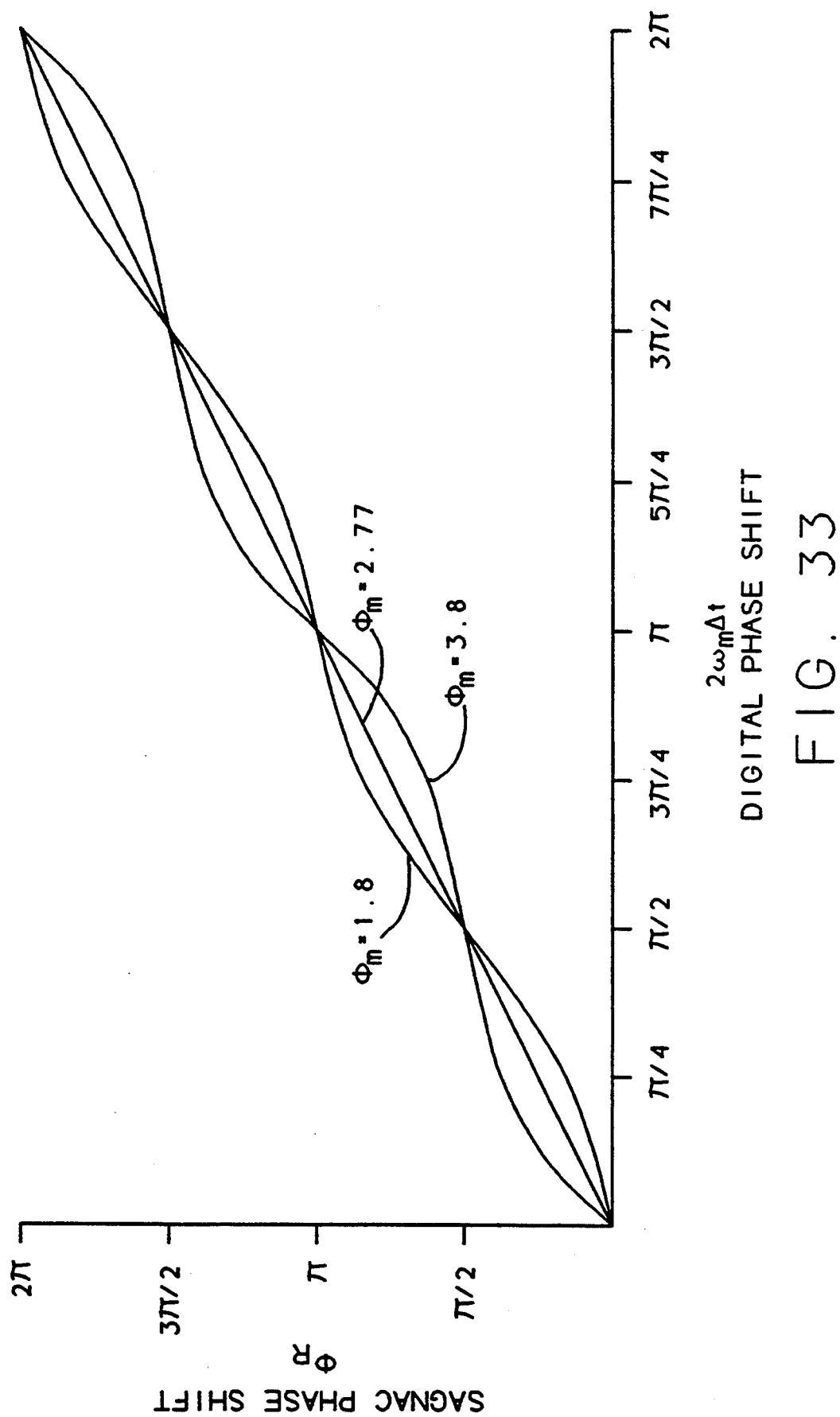
FIG. 33 is a plot of the rotation rate $\phi_R$ of the sensor versus the offset $2\omega_m \Delta t$ in the $B_1(t)$ and the $B_2(t)$ waveforms showing the linearity obtained by operating at a phase modulation amplitude of 2.77 radians.

The calculated $\Phi_R$ can be plotted as a function of $2\omega_m \Delta t$ for several phase modulation drive levels for $\phi_m$, as illustrated in FIG. 33 for $\phi_m = 1.8$ radians, $\phi_m = 2.77$ radians, and $\phi_m = 3.8$ radians. As illustrated, a phase modulation level $\phi_m$ of approximately 2.77 radians provides a substantially linear relationship between $\phi_m$ and $\Delta t$. Thus, by using a phase modulation level $\phi_m$ of 2.77 and by varying and measuring the $\Delta t$ required to provide a substantially zero low-pass filter output signal, the Sagnac phase shift $\Delta \Phi_R$ can be readily determined. The rotation rate can be integrated over time to generate an angular position signal.

The preferred embodiment is described herein as including an AC amplifier 520 to generate the AC output signal $I_D{}^{AC}(t)$ to simplify the description of the operation of the invention. In the alternative, the DC components can be eliminated in the output of the waveform synthesizer 526.

Figure 34:
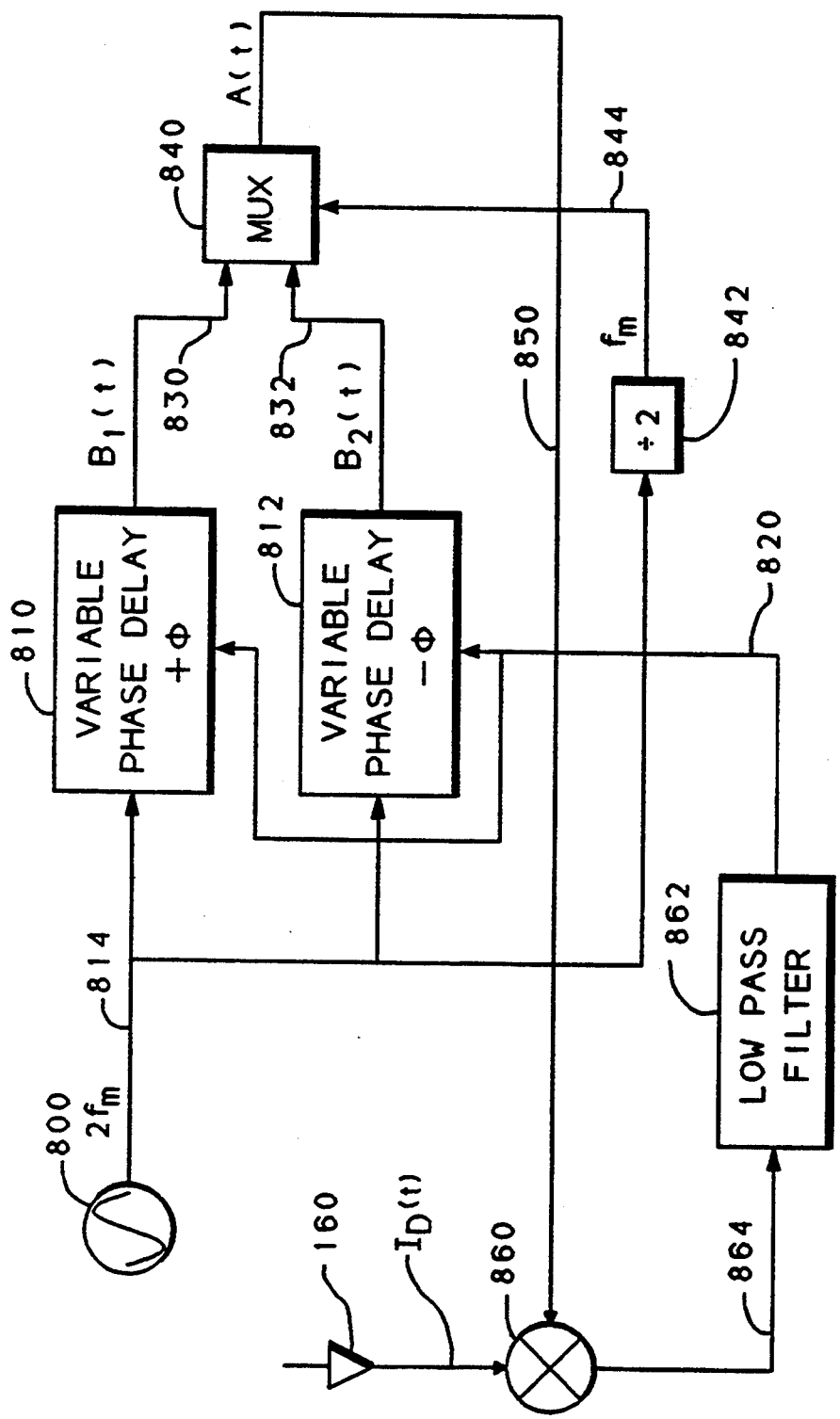
FIG. 34 illustrates an alternative embodiment of the rotation sensor of FIG. 9 that operates with sinusoidal waveforms.
Figure 36:
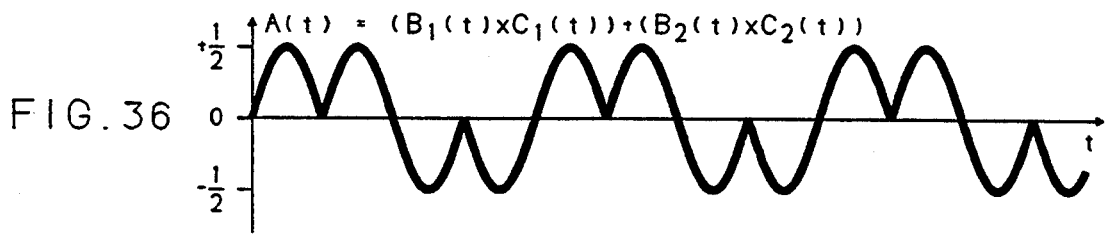
FIG. 36 illustrates an exemplary sinusoidal waveform for the output of the waveform synthesizer of FIG. 34 for a zero rotation rate or a rotation rate that induces a Sagnac phase shift that is a multiple of $\pi$, the A(t) waveform of FIG. 36 generally corresponding to the A(t) waveform of FIG. 12.
Figure 37:
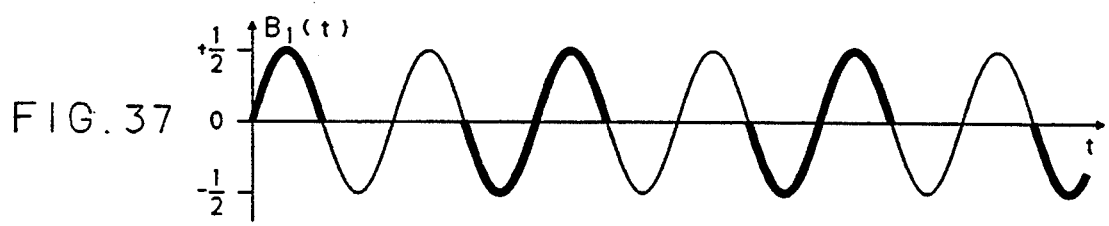
FIGS. 37, 38, 39 and 40 illustrate $B_1(t)$, $C_1(t)$, $B_2(t)$ and $C_2(t)$ waveforms, respectively, that can be advantageously used to construct the waveform of FIG. 36, the $B_1(t)$ and $B_2(t)$ waveforms of FIGS. 37 and 39 comprising sinusoidal waveforms rather than squarewaves as in FIGS. 13 and 15.
Figure 38:
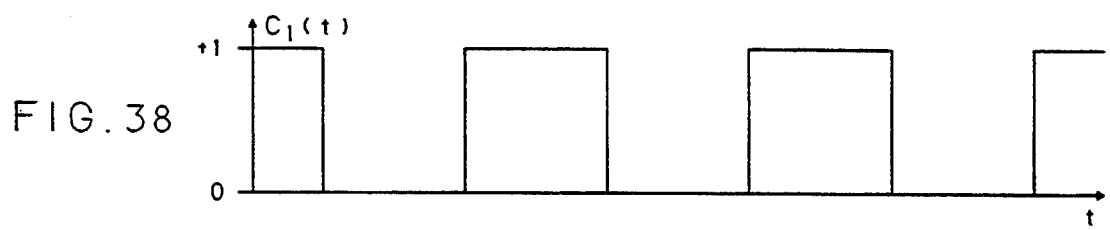
Figure 39:
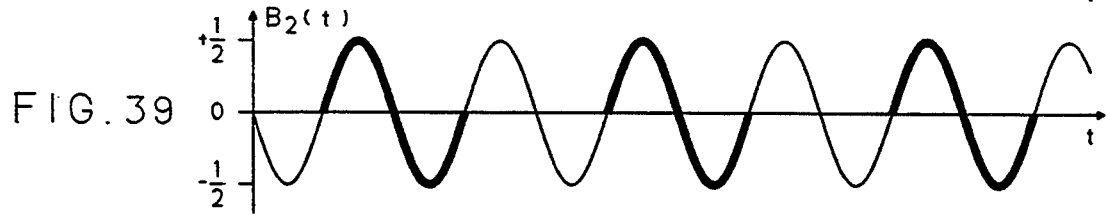
Figure 40:
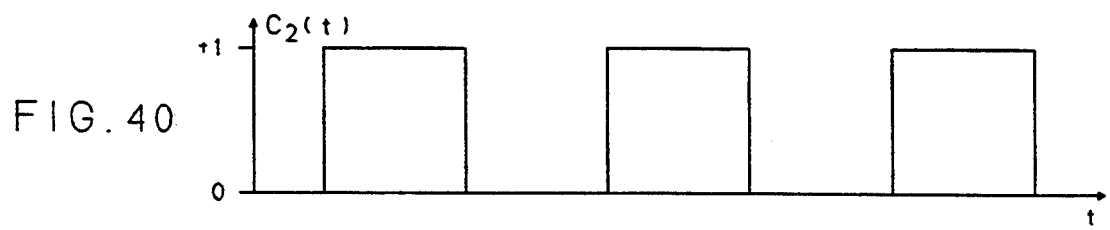
Figure 41:
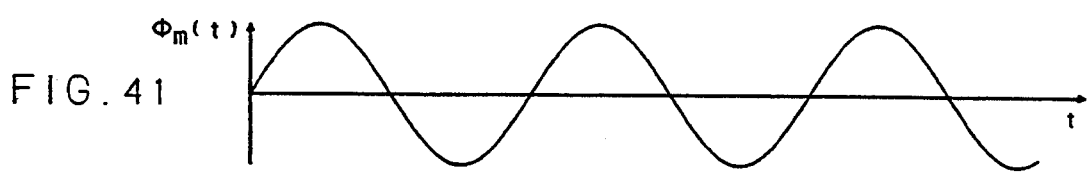
FIG. 41 illustrates an exemplary sinusoidal phase modulation signal at the frequency $f_m$.
Figure 42:
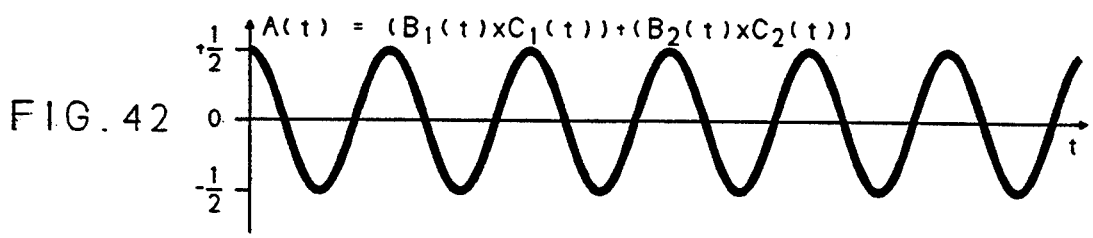
FIG. 42 illustrates an exemplary sinusoidal waveform for the output of the waveform synthesizer of FIG. 34 for a rotation rate that induces a Sagnac phase shift that is an odd multiple of $\pi/2$, the A(t) waveform of FIG. 42 generally corresponding to the A(t) waveform of FIG. 18.
Figure 43:
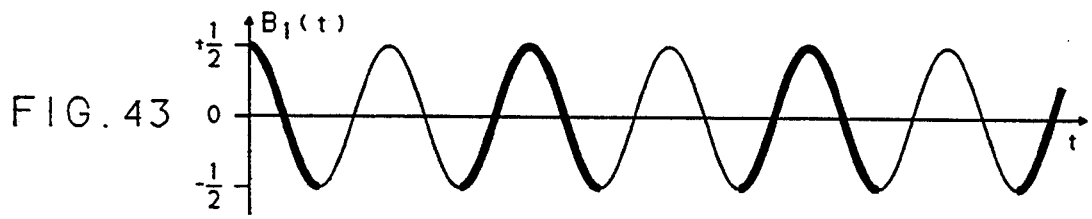
FIGS. 43, 44, 45 and 46 illustrate $B_1(t)$, $C_1(t)$, $B_2(t)$ and $C_2(t)$ waveforms, respectively, that can be advantageously used to construct the waveform of FIG. 42, showing the phase relationship between the $B_1(t)$ and $B_2(t)$ waveforms that causes the A(t) waveform of FIG. 42, the $B_1(t)$ and $B_2(t)$ waveforms of FIGS. 43 and 45 comprising sinusoidal waveforms rather than squarewaves as in FIGS. 19 and 21.
Figure 44:
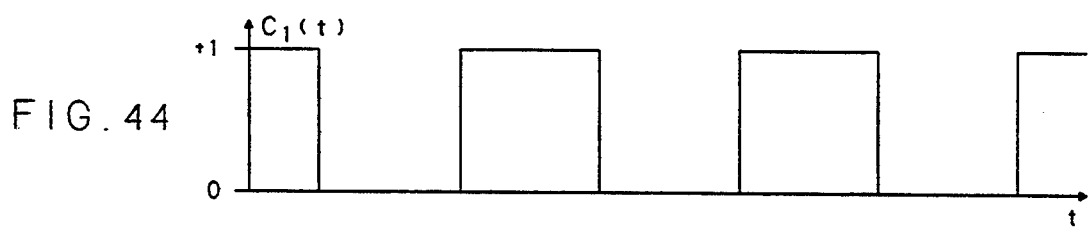
Figure 45:
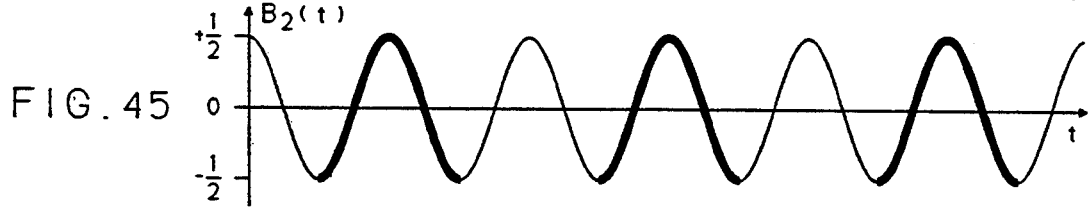
Figure 46:
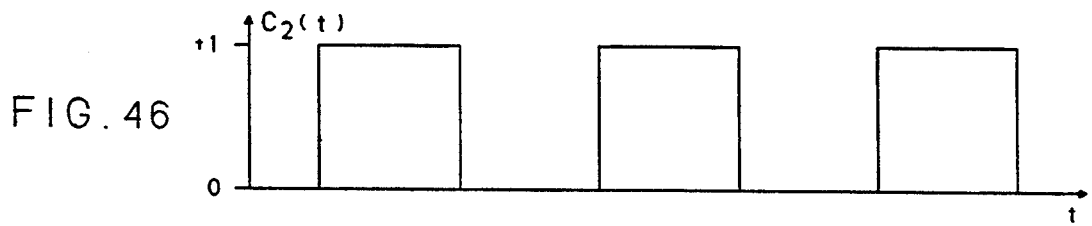
Figure 47:
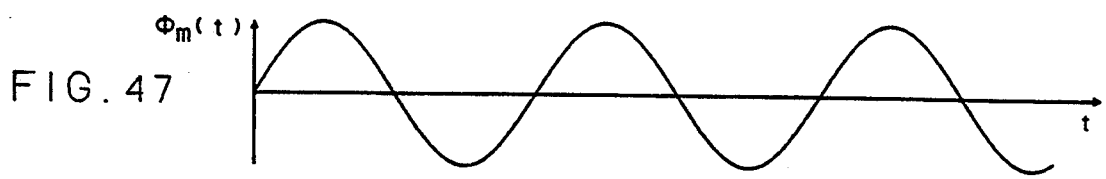
FIG. 47 illustrates an exemplary sinusoidal phase modulation signal at the frequency $f_m$.
Figure 48:
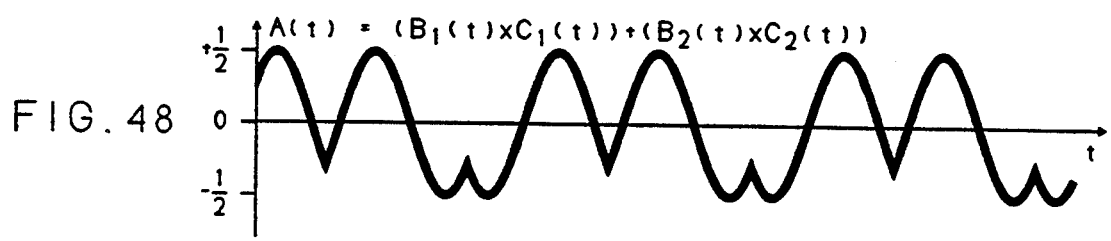
FIG. 48 illustrates an exemplary sinusoidal waveform for the output of the waveform synthesizer of FIG. 34 for a rotation rate that induces a Sagnac phase shift that is neither a multiple of $\pi$ nor an odd multiple of $\pi/2$, the A(t) waveform of FIG. 48 generally corresponding to the A(t) waveform of FIG. 24.
Figure 49:
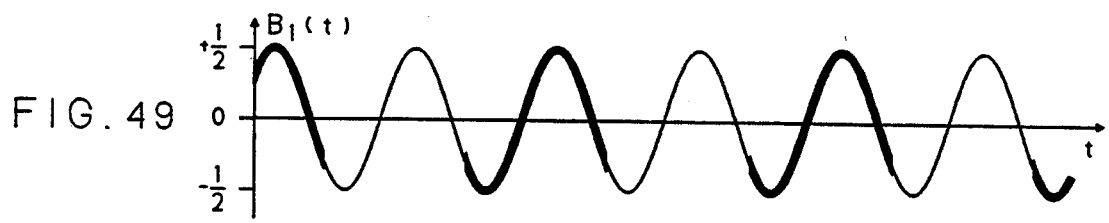
FIGS. 49, 50, 51 and 52 illustrate $B_1(t)$, $C_1(t)$, $B_2(t)$ and $C_2(t)$ waveforms, respectively, that can be advantageously used to construct the waveform of FIG. 48, showing the phase relationship between the $B_1(t)$ and $B_2(t)$ waveforms that causes the A(t) waveform of FIG. 48, the $B_1(t)$ and $B_2(t)$ waveforms of FIGS. 49 and 51 comprising sinusoidal waveforms rather than squarewaves as in FIGS. 25 and 27.
Figure 50:
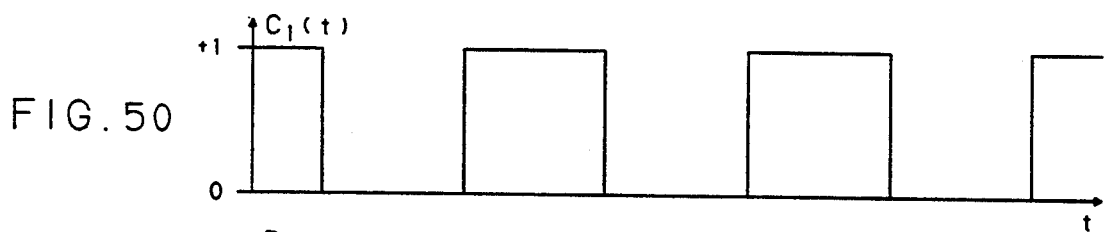
Figure 51:
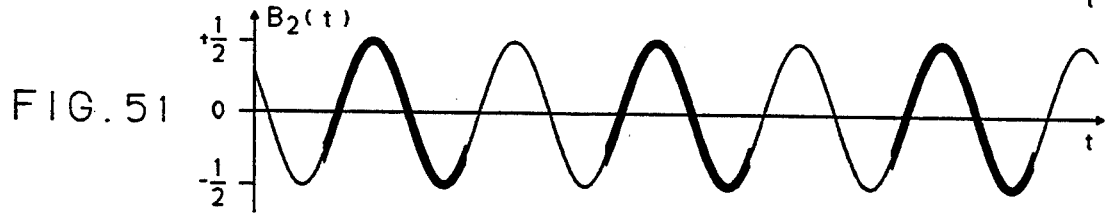
Figure 52:
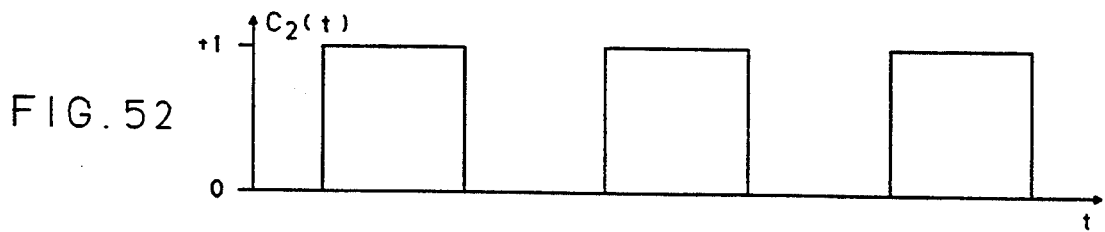

In an alternative embodiment, illustrated in FIG. 34, a waveform, shown as A(t) in FIG. 36, is generated. This waveform is multiplied by the output signal $I_D(t)$ so that the multiplier output signal M(t) includes DC terms that result from the harmonics of the output signal $I_D(t)$. The embodiment of FIG. 34 includes a sinusoidal frequency source 800 that operates at twice the reference frequency (e.g., $2f_m$). The output of the frequency source 800 is provided as inputs to a first variable phase delay 810 and a second variable phase delay 812 via a signal line 814. The variable phase delays operate in a conventional manner to delay the input signal by an amount of time ($\Delta t$) that is responsive to a control input signal, which, in the embodiment shown, is provided on a control line 820. The first variable phase delay 810 provides a positive phase delay in response to the control signal, and the second variable phase delay 812 provides a negative phase delay in response to the control signal. The output of the first variable phase delay 810 is a signal $B_1(t)$ on a signal line 830, and the output of the second variable phase delay is a signal $B_2(t)$ on a signal line 832. The two signals $B_1(t)$ and $B_2(t)$ are provided as inputs to a multiplexer 840 which is controlled by an output signal from a divide-by-two circuit 842 via a signal line 844. The input of the divide-by-two circuit 842 is the $2f_m$ signal from the frequency source 800. The multiplexer 840 operates to select the $B_1(t)$ signal during one-half cycle and to select the $B_2(t)$ signal during the next half cycle. The output of the multiplexer 840 is a signal A(t) on a signal line 850.

The A(t) signal is provided as an input to an analog multiplier 860, which has a second input connected to receive the $I_D(t)$ signal from the photodetector 160. The output of the analog multiplier is provided as the input to a low-pass filter 862 via a signal line 864. The output of the low-pass filter 864 is the DC control signal that controls the operation of the first variable delay circuit 810 and the second variable delay circuit 812.

Figure 35:
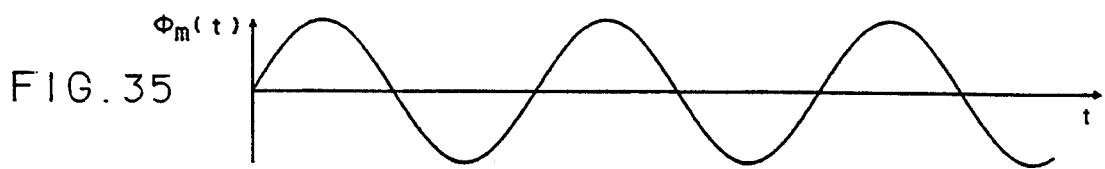
FIG. 35 illustrates an exemplary sinusoidal phase modulation signal at the frequency $f_m$.

In this alternative embodiment, the $B_1(t)$ waveform and the $B_2(t)$ waveforms are preferably sinusoidal waves at twice the reference frequency $f_m$ and initially shifted in phase by $\pi$. This is illustrated in FIGS. 35, 36, 37, 38, 39 and 40 for a zero rotation rate (i.e., $\Delta t$ equal to zero), where FIG. 35 illustrates the sinusoidal phase modulation frequency $\phi_m(t)$, and FIGS. 36, 37, 38, 39 and 40 illustrate the A(t) signal, the $B_1(t)$ signal, the $C_1(t)$ signal, the $B_2(t)$ signal and the $C_2(t)$ signal respectively. FIGS. 41, 42, 43, 44, 45 and 46 illustrated the same signals for a rotation rate resulting in a rotation induced phase difference of $\pi/2$. FIGS. 47, 48, 49, 50, 51 and 52 illustrate the same signals for a rotation rate corresponding to a rotation induced phase difference between zero and $\pi/2$. It can be seen that FIGS. 35–52, respectively, correspond to FIGS. 11–28, respectively, for the previously described squarewave embodiment of the invention.

Although the invention has been described in the context of a Sagnac interferometer for use as a rotation sensor, those skilled in the art will understand that the invention may be utilized in other types of interferometers for sensing ambient effects other than rotation. For example, the invention may be implemented in Mach-Zehnder interferometers, Michelson interferometers, Fabray-Perot interferometers (see, e.g., U.S. Pat. No. 4,469,397), or the like. Further, while the invention has been described in terms of a digital implementation, those skilled in the art will recognize that the invention may be implemented alternatively utilizing analog components.

What is claimed is:

1. A sensing apparatus for producing a sensor output signal, said apparatus comprising:
   an interferometer which produces an interferometer output signal responsive to a phase difference between first and second optical signals propagating in said interferometer;
   a generator that generates a reference signal; and
   a circuit which is connected to receive said reference signal and said output signal, and which produces a feedback signal in response to said reference signal and said output signal, said generator being connected to receive said feedback signal and to vary said reference signal in response to said feedback signal to drive said feedback signal toward a predetermined level.

2. The sensing apparatus as defined in claim 1, wherein said generator modifies a parameter of said reference signal in response to said feedback signal to null said feedback signal, the amount of modification of said reference signal being related to a quantity sensed by said interferometer.

3. The sensing apparatus as defined in claim 2, wherein said parameter comprises the harmonic content of said reference signal.

4. The sensing apparatus as defined in claim 2, wherein said parameter comprises a phase shift, and wherein said phase shift is related to said quantity sensed by said interferometer.

5. The sensing apparatus as defined in claim 2, wherein said interferometer comprises an optical loop in which said first and second waves counterpropagate, and a phase modulator in said loop that phase modulates said counterpropagating waves, said phase modulator being independent of said feedback signal.

6. The sensing apparatus as defined in claim 5, wherein the modification of said parameter is caused by a phase shift, and wherein said phase modulator is driven to provide a phase excursion which yields a linear relationship between said phase shift and said quantity sensed by said interferometer.

7. The sensing apparatus as defined in claim 6, wherein said quantity sensed by said interferometer is rotation.

8. A sensing apparatus for producing a sensor output signal, said apparatus comprising:
an interferometer which produces an interferometer output signal responsive to a phase difference between first and second optical signals propagating in said interferometer, said interferometer comprising an optical loop in which said first and second waves counterpropagate;
a phase modulator in said loop that phase modulates said counterpropagating waves;
a generator that generates a reference signal; and
a circuit which is connected to receive said reference signal and said output signal, and which produces a feedback signal in response to said reference signal and said output signal, said generator being connected to receive said feedback signal and to vary said reference signal in response to said feedback signal to drive said feedback signal toward a predetermined level, wherein:
said generator modifies a parameter of said reference signal in response to said feedback signal to null said feedback signal, the amount of modification of said reference signal being related to a quantity sensed by said interferometer;
said modification of said parameter is caused by a phase shift, and said phase modulator is driven to provide a phase excursion which yields a linear relationship between said phase shift and said quantity sensed by said interferometer;
said phase modulator is independent of said feedback signal; and said circuit comprises a multiplier which multiplies said output signal and said reference signal to provide said feedback signal.

9. The sensing apparatus as defined in claim 8, wherein said circuit additionally comprises a low pass filter which eliminates AC components in said feedback signal.

10. The sensing apparatus as defined in claim 9, wherein said first and second optical signals are phase modulated at a predetermined phase modulation frequency and a predetermined phase modulation amplitude, said optical signal from said interferometer and said reference signal both comprising harmonics of said modulation frequency.

11. The sensing apparatus as defined in claim 10, wherein said modulation frequency and modulation amplitude are generated independently of said output signal from said interferometer.

12. The sensing apparatus as defined in claim 11, wherein said phase modulation amplitude is approximately 2.77 radians.

13. The sensing apparatus as defined in claim 11, wherein said modulation frequency is selected to provide a 180-degree phase difference between the modulations of the two light waves, wherein said optical loop comprises an optical fiber and a directional coupler forming said fiber into said optical loop, and wherein said modulation frequency is calculated in accordance with the following equation:

$$f_m = \frac{c}{2n_{eq}L}$$

where:
$f_m$ is the modulation frequency;
L is the differential fiber length between said directional coupler and the phase modulator for the counterpropagating light waves, measured along said optical fiber between the phase modulator and a symmetrical point on the opposite end of the sensing loop;
$n_{eq}$ is the equivalent refractive index for the optical fiber; and
c is the free space velocity of the light applied to the sensing loop.

14. A method of processing an output signal from an interferometer to determine a change in a phase difference between two optical signals propagating in said interferometer, said method comprising the steps of:
generating a reference signal;
generating a feedback signal in response to (i) said reference signal and (ii) said output signal from said interferometer;
modifying said reference signal in response to changes in said output signal to drive said feedback signal toward a predetermined value, said change in said phase difference of said two optical signals being independent of said modification of said reference signal; and
measuring the modification to said reference signal to determine said changes in said phase difference.

15. A method of processing an output signal from an interferometer to determine changes in a phase difference between two optical signals propagating in said interferometer, said optical signals being phase modulated at a predetermined frequency and said output signal comprising harmonics of said predetermined frequency, said method comprising the steps of:
multiplying said output signal with a reference signal comprising harmonics of said frequency to produce a feedback signal of predetermined magnitude at a first phase difference;
modifying the harmonic content of said reference signal in response to a reference signal modification parameter to maintain said predetermined magnitude of said feedback signal when said phase difference changes to a second phase difference; and
measuring said reference signal modification parameter to determine the change in said phase difference.

16. The method as defined in claim 15, wherein said reference signal modification parameter comprises a phase shift, and wherein said phase modulation is at an amplitude selected to provide a linear relationship between the phase shift parameter of the reference signal and the phase difference of the optical signals.

17. A rotation sensing apparatus, comprising:
an interferometer having a pair of counterpropagating waves in an optical loop, said interferometer combining said counterpropagating waves to form an output signal; and
a circuit that receives said output signal, said circuit comprising a feedback loop that processes said output signal of said interferometer and determines rotation of said loop without affecting said counterpropagating waves in said loop.

18. A detection on system for a Sagnac effect rotation sensor that includes an optical loop for counterpropagating optical signals and a modulator that asymmetrically modulates the counterpropagating light signals at a modulation frequency se that the rotation sensor provides an optical output signal having an intensity that varies in response to the modulation signal and in response to rotation, said detection system comprising:
a detector that receives the optical output signal and generates an electrical output signal responsive thereto;
a multiplier that receives said electrical output signal and that receives a reference signal, said multiplier providing a multiplier output signal responsive to the multiplication of said electrical output signal and said reference signal;
a low pass filter that receives said multiplier output signal and generates a low pass filter output signal having a magnitude and a polarity responsive to the DC components of said multiplier output signal; and
a signal generator that receives said low pass filter output signal and that generates said reference signal, said reference signal comprising a pulse train having pulses that are spaced with respect to each other such that the reference signal comprises odd and even harmonics of said modulation frequency, said signal generator varying said pulse train of said reference signal in response to said low pass filter output signal so that said reference signal multiplied by said electrical output signal produces a multiplier output signal having a DC magnitude substantially equal to zero.

19. An interferometer, comprising:
an optical loop for sensing rotation; and
a phase modulator for modulating the phase of light propagating through said optical loop, said optical loop outputting light to form an optical output signal, said phase modulator being driven at a constant frequency and at a constant amplitude selected to provide a linear relationship between said output signal and said rotation wherein said amplitude is selected to cause the phase modulation of said light to be 2.77 radians.

20. A method of operating an interferometer having a loop which provides an output signal that varies in response to rotation, said method comprising the steps of modulating the light propagating in the loop at a constant frequency, and selecting a constant amplitude which yields a linear relationship between said output signal and said rotation wherein said amplitude is selected to cause the phase modulation of said light to be 2.77 radians.

* * * * *

UNITED STATES PATENT AND TRADEMARK OFFICE
CERTIFICATE OF CORRECTION

PATENT NO. : 5,355,216
DATED : October 11, 1994
INVENTOR(S) : Byoung Y. Kim, et al.

It is certified that error appears in the above-indentified patent and that said Letters Patent is hereby corrected as shown below:

Column 37, line 17, claim 18, after "detection", delete "on".

Column 37, line 21, claim 18, between "frequency" and "that", change "se" to --so--.

Signed and Sealed this

Twenty-third Day of January, 1996

Attest:

BRUCE LEHMAN

Attesting Officer

Commissioner of Patents and Trademarks